US012665669B2

(12) United States Patent
Ito et al.

(10) Patent No.: US 12,665,669 B2
(45) Date of Patent: Jun. 23, 2026

(54) WIRELESS COMMUNICATION METHOD AND WIRELESS COMMUNICATION SYSTEM

(71) Applicant: NTT, Inc., Tokyo (JP)

(72) Inventors: Kota Ito, Musashino (JP); Mizuki Suga, Musashino (JP); Takuto Arai, Musashino (JP); Yushi Shirato, Musashino (JP); Naoki Kita, Musashino (JP)

(73) Assignee: NTT, Inc., Tokyo (JP)

( * ) Notice: Subject to any disclaimer, the term of this patent is extended or adjusted under 35 U.S.C. 154(b) by 174 days.

(21) Appl. No.: 18/290,482

(22) PCT Filed: May 17, 2021

(86) PCT No.: PCT/JP2021/018615
§ 371 (c)(1),
(2) Date: Nov. 14, 2023

(87) PCT Pub. No.: WO2022/244057
PCT Pub. Date: Nov. 24, 2022

(65) Prior Publication Data
US 2024/0259098 A1      Aug. 1, 2024

(51) Int. Cl.
*H04B 10/2575*      (2013.01)

(52) U.S. Cl.
CPC ................................. *H04B 10/2575* (2013.01)

(58) Field of Classification Search
None
See application file for complete search history.

(56) References Cited

U.S. PATENT DOCUMENTS 5,333,000 A      7/1994   Hietala et al.
6,807,343 B2    10/2004   Tulchinsky et al.
(Continued)

FOREIGN PATENT DOCUMENTS

JP            4246724 B2  *  4/2009
JP         2017-118483 A       6/2017
(Continued)

OTHER PUBLICATIONS

Dennis T.K. Tong et al., "A Novel Multiwavelength Optically Controlled Phased Array Antenna with a Programmable Dispersion Matrix", IEEE Photonics Technology Letters, Jun. 1996, vol. 8, No. 6, pp. 812-814.
(Continued)

*Primary Examiner* — David W Lambert

(57)      ABSTRACT

A wireless communication method in a wireless communication system including an exchange device and a base station device that performs beamforming according to the control of the exchange device, in which: the exchange device performs beamforming control of the base station device by transmitting an optically modulated signal to the base station device via an optical transmission line, the optically modulated signal being generated by modulating an intensity of an optical signal on a basis of a transmission signal to be transmitted by controlling any combination of an optical wavelength, a frequency, and an optical polarization or controlling the frequency; and the base station device performs beamforming in a direction in which a wireless signal radiated from an antenna to which an electrical signal based on the optically modulated signal has been input is reflected by a reflector or is transmitted through a lens among antennas corresponding to the number of combinations of the optical wavelength, the frequency, and the optical polarization or the number of frequencies.

8 Claims, 20 Drawing Sheets

(56) References Cited

U.S. PATENT DOCUMENTS

| 7,929,864 | B2 | 4/2011 | Chen et al. |
|---|---|---|---|
| 9,838,125 | B2 | 12/2017 | Prucnal et al. |
| 11,283,168 | B2 | 3/2022 | Bourderionnet et al. |
| 11,564,020 | B1 | 1/2023 | Xu et al. |
| 11,699,862 | B2 | 7/2023 | Brown et al. |
| 11,804,901 | B2 | 10/2023 | Suga et al. |
| 11,936,429 | B2 | 3/2024 | Ito et al. |
| 2015/0086212 | A1 | 3/2015 | Yu |
| 2017/0180053 | A1 | 6/2017 | Lozhkin |
| 2021/0013953 | A1 | 1/2021 | Hormis et al. |
| 2022/0385368 | A1 | 12/2022 | Ito et al. |
| 2022/0393764 | A1 | 12/2022 | Ito et al. |
| 2024/0259098 | A1 | 8/2024 | Ito et al. |
| 2025/0233303 | A1 | 7/2025 | Murakowski |

FOREIGN PATENT DOCUMENTS

| WO | 202106041 | A1 | 6/2021 |
|---|---|---|---|
| WO | WO-2021/106043 | A1 | 6/2021 |

OTHER PUBLICATIONS

Wei Hong et al., "Multibeam Antenna Technologies for 5G Wireless Communications", IEEE Transactions on Antennas and Propagation, Jun. 7, 2017, vol. 65, No. 12, pp. 6231-6249.

Kyo Minoguchi et al., "Beam Steering of 60 GHz-Band Array-Antenna Utilizing Radio-over-Fiber Transmission Technique and Effect of Chromatic Dispersion", The transactions of the Institute of Electronics, Information and Communication Engineers C, Aug. 9, 2016, vol. J99-C, No. 9, pp. 425-433.

International Search Report of the International Searching Authority, issued in PCT/JP2021/018615, mailed Jul. 6, 2021; ISA/JP.

International Search Report of the International Searching Authority, issued in PCT/JP2021/018577, mailed Jul. 6, 2021; ISA/JP.

Caroline et al., Performance analysis and comparison of optical signal processing beamforming networks: a survey, Springer, 2019 (Year: 2019).

Ito et al., Experimental Evaluation of Remote Beamforming Scheme with Fixed Wavelength Allocation for Radio-over-Fiber Systems , Feb. 2021 (Year: 2021).

* cited by examiner

EXCHANGE DEVICE                    BASE STATION DEVICE

SELECT FREQUENCY AND
OPTICAL POLARIZATION      S301

CONVERT FREQUENCY OF
TRANSMISSION SIGNAL       S302

MODULATE INTENSITY        S303

OPTICALLY MODULATED SIGNAL

S304

SEPARATE
POLARIZATION COMPONENT    S305

PHOTOELECTRIC CONVERSION   S306

DEMULTIPLEX ELECTRICAL SIGNAL   S307

CONVERT FREQUENCY OF
ELECTRICAL SIGNAL         S308

TRANSMIT WIRELESS SIGNAL   S309

EXCHANGE DEVICE                    BASE STATION DEVICE

SELECT OPTICAL POLARIZATION
AND OPTICAL WAVELENGTH          ~S401

MODULATE INTENSITY          ~S402

OPTICALLY MODULATED SIGNAL

S403

DEMULTIPLEX OPTICALLY
MODULATED SIGNAL          ~S404

SEPARATE
POLARIZATION COMPONENT          ~S405

PHOTOELECTRIC CONVERSION          ~S406

TRANSMIT WIRELESS SIGNAL          ~S407

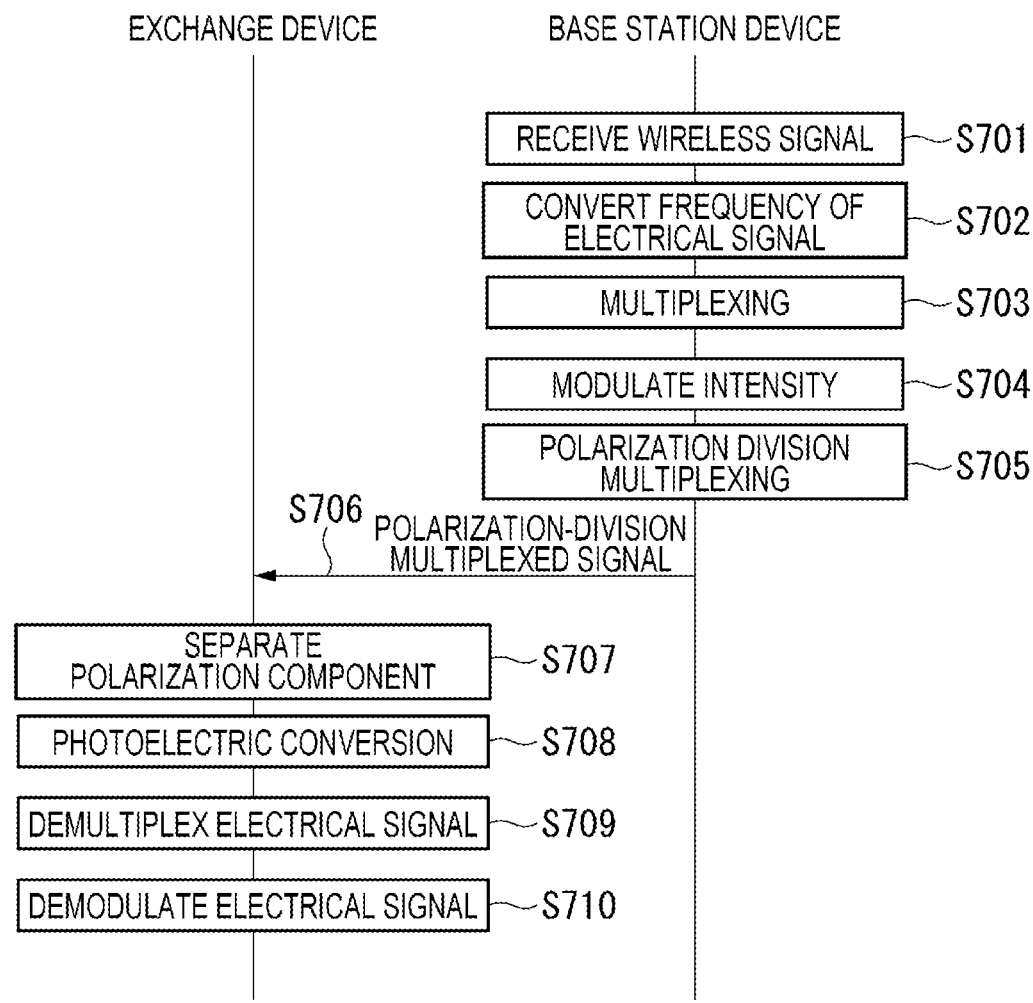

EXCHANGE DEVICE                    BASE STATION DEVICE

RECEIVE WIRELESS SIGNAL ─── S701

CONVERT FREQUENCY OF
ELECTRICAL SIGNAL ─── S702

MULTIPLEXING ─── S703

MODULATE INTENSITY ─── S704

POLARIZATION DIVISION
MULTIPLEXING ─── S705

S706 POLARIZATION-DIVISION
MULTIPLEXED SIGNAL

SEPARATE
POLARIZATION COMPONENT ─── S707

PHOTOELECTRIC CONVERSION ─── S708

DEMULTIPLEX ELECTRICAL SIGNAL ─── S709

DEMODULATE ELECTRICAL SIGNAL ─── S710

FIG. 15

WIRELESS COMMUNICATION METHOD AND WIRELESS COMMUNICATION SYSTEM

CROSS-REFERENCE TO RELATED APPLICATIONS

This application is a 371 U.S. National Phase of International Application No. PCT/JP2021/018615, filed on May 17, 2021. The entire disclosure of the above application is incorporated herein by reference.

TECHNICAL FIELD

The present invention relates to a wireless communication method and a wireless communication system.

BACKGROUND ART

Conventionally, wireless communication using a millimeter-wave band that allows high-speed transmission has attracted attention. However, in a case where the millimeter-wave band is used, there is a problem that a propagation loss is large and long-distance transmission is difficult. A radio over fiber (RoF) system enables long-distance transmission of a radio frequency signal (RF signal) in the millimeter-wave band, but a coverage area of an antenna unit is a problem. One solution to the problem is beamforming using an array antenna. Techniques disclosed in Patent Literature 1 and Non Patent literature 1 are proposed as a beamforming technology using the RoF system or an optical technology.

CITATION LIST

Patent Literature

Patent Literature 1: JP 4246724 B2

Non Patent Literature

Non Patent Literature 1: Dennis T. K. Tong, Ming C. Wu, "A Novel Multiwavelength Optically Controlled Phased Array Antenna with a Programmable Dispersion Matrix", IEEE Photonics Technology Letters, June 1996, VOL. 8, NO. 6, p. 812-814.

SUMMARY OF INVENTION

Technical Problem

FIG. 19 is an explanatory diagram of an overview of a wireless communication system 100 in Patent Literature 1. The wireless communication system 100 includes an exchange device 200 and a base station device 300. The exchange device 200 and the base station device 300 are connected via an optical fiber 400. The exchange device 200 modulates a plurality of optical signals having a specific wavelength interval output from a multi-wavelength variable light source 201 by using an optical modulator 202 and transmits the modulated optical signals to the base station device 300. At this time, when the optical fiber 400 transmits the optically modulated signals having a plurality of wavelengths, a delay difference different for each wavelength occurs due to an influence of chromatic dispersion.

The base station device 300 demultiplexes the optically modulated signals transmitted from the exchange device 200 for each wavelength by using an optical demultiplexer 301 and converts the optically modulated signals into electrical signals by using O/Es 302-1 to 302-p (p is an integer of 1 or more). The electrical signals are fed to antennas 303-1 to 303-p, but a delay difference also occurs between the electrical signals due to the delay difference caused by the chromatic dispersion generated when the optical fiber 400 has transmitted the signals. Thus, directivity is formed when the electrical signals are radiated as radio waves. Therefore, it is possible to control beam directions by controlling wavelengths of the optical signals output by the multi-wavelength variable light source 201.

However, a wavelength interval of the optical signals needs to be extremely large or small depending on the beam direction, a length of the optical fiber, and a frequency of an RF signal. In the former case, a wavelength band to be used is widened, which may reduce wavelength utilization efficiency. Meanwhile, in the latter case, it is difficult to control the multi-wavelength variable light source 201.

Further, in the technique in Patent Literature 1, in order to dynamically control an optical wavelength to dynamically control the beam direction, it is also necessary to dynamically control a demultiplexing mechanism of the optical demultiplexer 201 included in the base station device 300. Therefore, it is necessary to control the base station device 300, and thus simplification of the base station device 300 is limited. Further, in the technique in Patent Literature 1, distance information of the optical fiber is required for wavelength adjustment for adjusting a delay difference between optical signals. The length of the optical fiber 400 between the exchange device 200 and the base station device 300 is not generally known, or, even if an approximate length thereof is known, an accurate length is not commonly known. Therefore, it is considered that an applicable range of the technique in Patent Literature 1 is limited.

FIG. 20 is an explanatory diagram of the technique disclosed in Non Patent Literature 1. A device in FIG. 20 includes a multi-wavelength variable light source 501, an optical modulator 502, a programmable dispersion matrix (PDM) 503, an optical demultiplexer 504, O/Es 505-1 to 505-p, and antennas 506-1 to 506-p. FIG. 21 illustrates a configuration example of a conventional PDM 503. As illustrated in FIG. 21, the PDM 503 includes a plurality of optical switches 511-1 to 511-q (q is an integer of 2 or more) and a plurality of delay units 512-1 to 512-q. Unlike the technique in Patent literature 1, the antennas fixedly correspond to different optical wavelengths, respectively, in the technique disclosed in Non Patent Literature 1. Further, the PDM 503 controls a dispersion value, controls a delay difference for each optical wavelength, and controls a beam direction.

Because the optical wavelengths are fixed in the technique disclosed in Non Patent Literature 1, the wavelength utilization efficiency is better than that in Patent Literature 1. Further, optical demultiplexing is also fixed, and thus there is no need to control the optical demultiplexer. However, it is considered that the PDM for controlling dispersion needs to be designed and manufactured with high accuracy, which may increase the size and cost of the device.

Further, there is no reference to application to the RoF in the technique disclosed in Non Patent Literature 1. In order to apply the RoF to the technique disclosed in Non Patent Literature 1 to perform long-distance optical fiber transmission, it is necessary to consider not only dispersion control using the PDM but also an influence of chromatic dispersion during the optical fiber transmission. Further, both the techniques of Patent Literature 1 and Non Patent Literature 1 make reference to beamforming of a transmission antenna, but do not make reference to beamforming of a receiving antenna.

In view of the above circumstances, an object of the present invention is to provide a technique capable of performing beamforming control of a transmission/receiving antenna, without controlling a base station device or using distance information of an optical fiber, while suppressing a decrease in wavelength utilization efficiency and an increase in cost.

Solution to Problem

One aspect of the present invention is a wireless communication method in a wireless communication system including an exchange device and a base station device configured to perform beamforming according to the control of the exchange device, in which: the exchange device performs beamforming control of the base station device by transmitting an optically modulated signal to the base station device via an optical transmission line, the optically modulated signal being generated by modulating an intensity of an optical signal on a basis of a transmission signal to be transmitted by controlling any combination of an optical wavelength, a frequency, and an optical polarization or controlling the frequency; and the base station device performs beamforming in a direction in which a wireless signal radiated from an antenna to which an electrical signal based on the optically modulated signal has been input is reflected by a reflector or is transmitted through a lens among antennas corresponding to the number of combinations of the optical wavelength, the frequency, and the optical polarization or the number of frequencies.

One aspect of the present invention is a wireless communication system including an exchange device and a base station device configured to perform beamforming according to the control of the exchange device, in which: the exchange device includes a control unit configured to control any combination of an optical wavelength, a frequency, and an optical polarization or controls the frequency, and an optical modulator configured to transmit an optically modulated signal to the base station device via an optical transmission line, the optically modulated signal being generated by modulating an intensity of an optical signal on the basis of a transmission signal to be transmitted on the basis of the any combination of the optical wavelength, the frequency, and the optical polarization or the frequency switched by the control unit; the base station device includes antennas corresponding to the number of combinations of the optical wavelength, the frequency, and the optical polarization or the number of frequencies, and a reflector or lens configured to reflect or transmits a wireless signal radiated from an antenna to which an electrical signal based on the optically modulated signal has been input; and the reflector or the lens performs beamforming in a direction in which the reflection or the transmission has been performed.

Advantageous Effects of Invention

According to the present invention, it is possible to perform beamforming control of a transmission/receiving antenna, without controlling a base station device or using distance information of an optical fiber, while suppressing a decrease in wavelength utilization efficiency and an increase in cost.

BRIEF DESCRIPTION OF DRAWINGS

FIG. 15 is a sequence diagram illustrating a flow of processing of the wireless communication system according to the seventh embodiment.

DESCRIPTION OF EMBODIMENTS

Hereinafter, embodiments of the present invention will be described with reference to drawings.

First Embodiment

Figure 1:
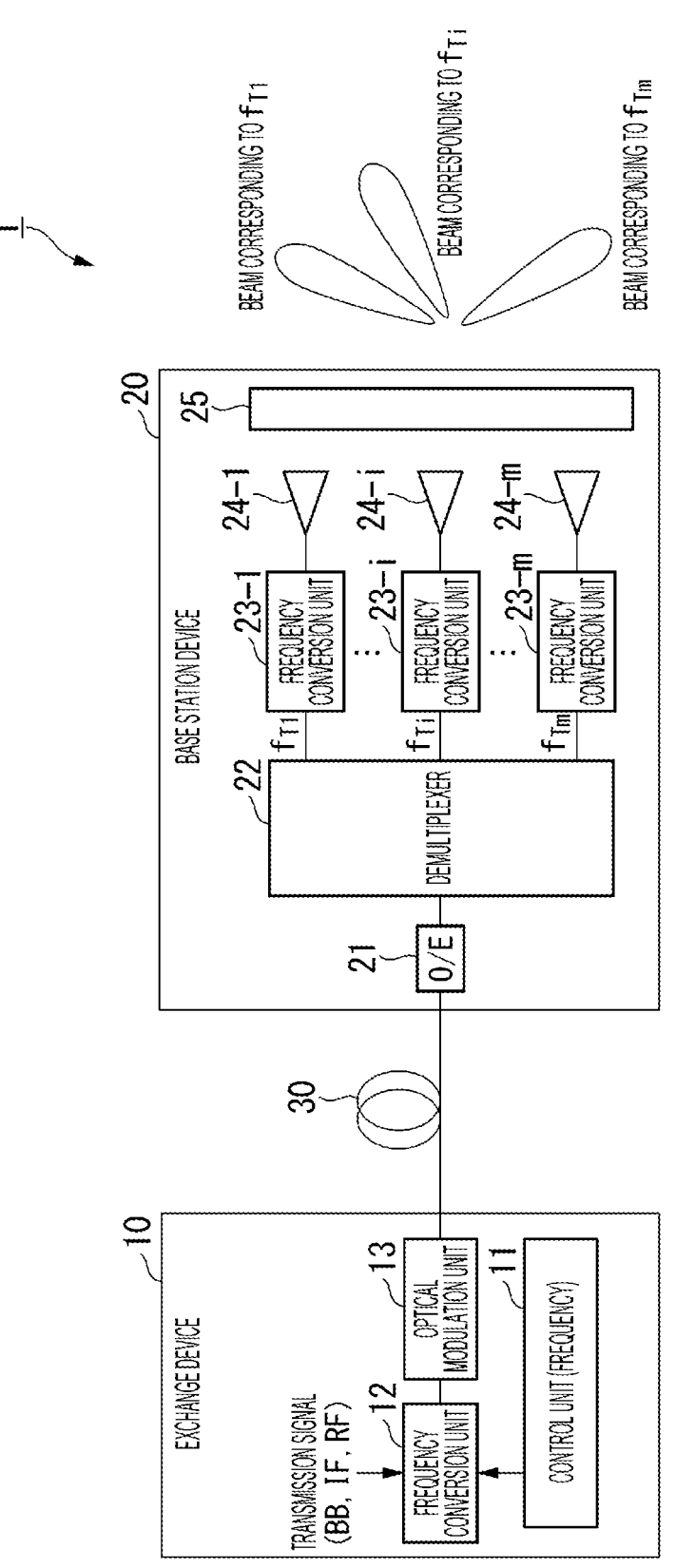
FIG. 1 illustrates a configuration example of a wireless communication system according to a first embodiment.

FIG. 1 illustrates a configuration example of a wireless communication system 1 according to a first embodiment. The wireless communication system 1 includes an exchange device 10 and a base station device 20. The exchange device 10 and the base station device 20 are connected via an optical transmission line 30. The optical transmission line 30 is, for example, an optical fiber. The optical transmission line 30 may be one or more single-core fibers or a multi-core fiber having one or more cores. In the following description, a direction from the exchange device 10 toward the base station device 20 will be referred to as a downstream direction, and a direction from the base station device 20 toward the exchange device 10 will be referred to as an upstream direction.

FIG. 1 illustrates a case of one base station device 20, but the wireless communication system 1 may include a plurality of base station devices 20. In this case, the exchange device 10 and the plurality of base station devices 20 may be connected by a passive optical network (PON). In a case where the exchange device 10 and the plurality of base station devices 20 are connected by the PON, an optical splitter (splitting unit) is provided between the exchange device 10 and the plurality of base station devices 20. The optical splitter splits an optical signal output from the exchange device 10 and outputs the split optical signals to the base station devices 20. The passive optical network is, for example, a wavelength division multiplexing passive optical network (WDM-PON) or a time-division multiplexing passive optical network (TDM-PON).

The exchange device 10 remotely controls a beam of the base station device 20 by switching a frequency of a transmission signal. The exchange device 10 remotely controls the beam of the base station device 20 by using an analog RoF technology. Note that the transmission signal may be a base band (BB) signal, an intermediate frequency (IF) signal, or an RF signal.

The base station device 20 wirelessly radiates a signal transmitted from the exchange device 10.

Next, specific configurations of the exchange device 10 and the base station device 20 will be described.

The exchange device 10 includes a control unit (controller) 11, a frequency conversion unit 12, and an optical modulation unit 13.

The control unit 11 selects a frequency according to a direction in which a beam is to be formed in the base station device 20. For example, the control unit 11 selects one or more of m (m is an integer of 1 or more) frequencies $f_{T1}$, . . . , and $f_{Tm}$.

The frequency conversion unit 12 converts a frequency of an input transmission signal into a frequency $f_{Ti}$ designated by the control unit 11. Note that i is an integer of 1 or more and m or less.

The optical modulation unit 13 modulates an intensity of an optical signal having a certain wavelength by using the signal having the frequency $f_{Ti}$. Thus, the optical modulation unit 13 generates an optically modulated signal. The optical modulation unit 13 transmits the generated optically modulated signal to the base station device 20 via the optical transmission line 30.

The base station device 20 includes an O/E 21, a demultiplexer 22, a plurality of frequency conversion units 23-1 to 23-m, a plurality of antennas 24-1 to 24-m, and a lens/reflector 25.

The O/E 21 is a photoelectric conversion unit that converts the optically modulated signal received via the optical transmission line 30 into an electrical signal. Therefore, the O/E 21 extracts the electrical signal having the frequency f-n.

The demultiplexer 22 demultiplexes the electrical signal extracted by the O/E 21 according to the frequency.

The frequency conversion units 23-1 to 23-m convert frequencies of input electrical signals into frequencies in an RF band.

The antennas 24-1 to 24-m receive the electrical signals output from the frequency conversion units 23-1 to 23-m.

The antennas 24-1 to 24-m radiate wireless signals corresponding to the input electrical signals.

The lens/reflector 25 is, for example, a parabola antenna, a reflectarray, a lens antenna, or a transmitarray. For example, in a case where the lens/reflector 25 is a reflectarray, the reflectarray reflects the wireless signals radiated from the antennas 24-1 to 24-m. More specifically, the reflectarray reflects the wireless signals so as to have a phase difference in directions corresponding to positions of the antennas 24-1 to 24-m. Thus, the reflectarray can form beams in the directions corresponding to the positions of the antennas 24-1 to 24-m. For example, the reflectarray may be a reflectarray in which elements having controlled reflection phases are arrayed and planarized.

In a case where the lens/reflector 25 is a transmitarray, the transmitarray transmits the wireless signals radiated from the antennas 24-1 to 24-m so as to have a phase difference in the directions corresponding to the positions of the antennas 24-1 to 24-n. Thus, the transmitarray can form beams in the directions corresponding to the positions of the antennas 24-1 to 24-m. For example, the transmitarray may be a transmitarray in which elements having controlled transmission phases are arrayed and planarized.

As described above, the lens/reflector 25 can form beams in the directions corresponding to the positions of the antennas 24-1 to 24-m. In the first embodiment, the exchange device 10 remotely controls beams of the antennas 24-1 to 24-m by switching a frequency of a transmission signal. The lens/reflector 25 has input/output reversibility, and, when a wireless signal arrives from a direction of a beam corresponding to a certain antenna 24-1 to 24-m, the wireless signal converges to a position of the antenna 24 (see, for example. Reference Literature 1).

(Reference Literature 1: Wei Hong, Zhi Hao Jiang, Chao Yu, Jianyi Zhou, Peng Chen, Zhiqiang Yu, Hui Zhang, Binqi Yang. Xingdong Pang, Mei Jiang, Yujian Cheng, Mustafa K. Taher Al-Nuaimi, Yan Zhang, Jixin Chen, and Shiwen He, "Multibeam antenna technologies for 5G wireless communications", IEEE Transactions on Antennas and Propagation," 65(12), 6231-6249 (2017).)

Figure 2:
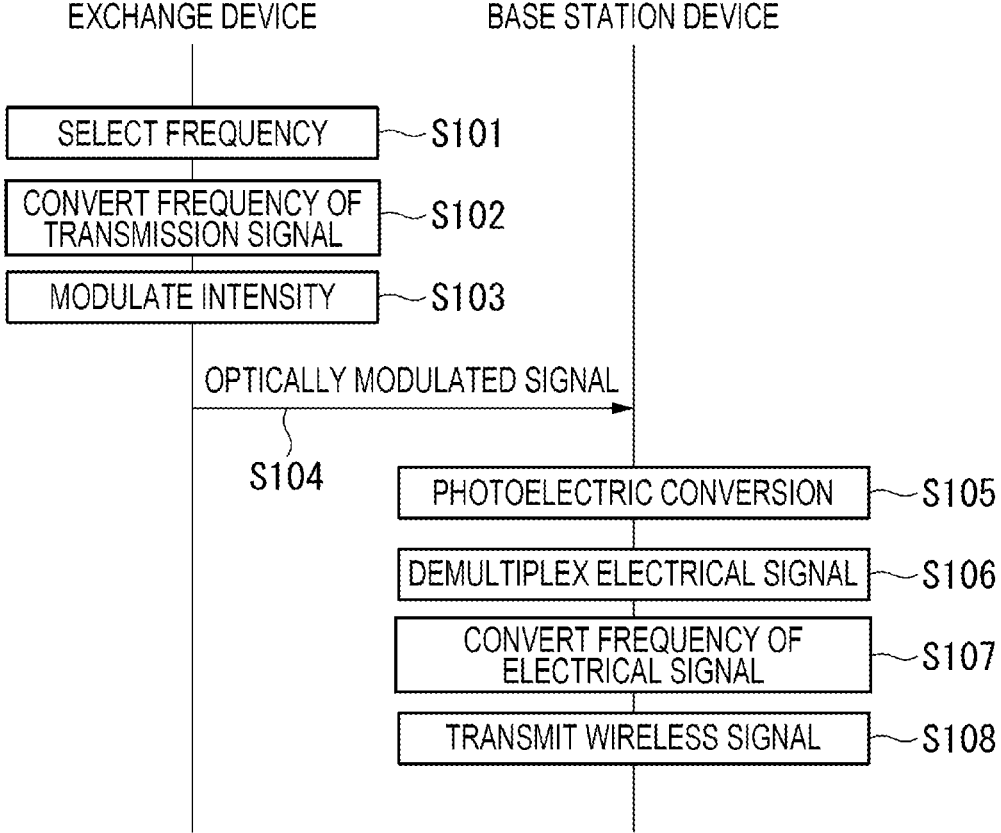
FIG. 2 is a sequence diagram illustrating a flow of processing of the wireless communication system according to the first embodiment.

FIG. 2 is a sequence diagram illustrating a flow of processing of the wireless communication system 1 according to the first embodiment.

The control unit 11 selects a frequency according to a direction in which a beam is to be formed in the base station device 20 (step S101). For example, the control unit it selects one frequency $f_{T1}$ from the m frequencies $f_{T1}$, . . . , and $f_{Tm}$. The control unit 11 controls the frequency conversion unit 12 so as to convert a frequency into the selected frequency $f_{T1}$.

The frequency conversion unit 12 converts a frequency of an input transmission signal into the frequency $f_{T1}$ designated by the control unit 11 (step S102). The frequency conversion unit 12 outputs the transmission signal having the frequency $f_{Ti}$ to the optical modulation unit 13. The optical modulation unit 13 modulates an intensity of an optical signal having a certain wavelength by using the transmission signal having the frequency $f_{Ti}$ output from the frequency conversion unit 12 (step S103). Thus, the optical modulation unit 13 generates an optically modulated signal. The optical modulation unit 13 transmits the generated optically modulated signal to the optical transmission line 30 (step S104).

The optically modulated signal transmitted to the optical transmission line 30 is input to the base station device 20. The O/E 21 of the base station device 20 converts the input optically modulated signal into an electrical signal (step S105). By this processing, the optically modulated signal is convened into an electrical signal having the frequency $f_{Ti}$. The O/E 21 outputs the electrical signal having the frequency $f_{Ti}$ to the demultiplexer 22. The electrical signal having the frequency $f_{Ti}$ output to the demultiplexer 22 is demultiplexed according to the frequency (step S106).

Output ports of the demultiplexer 22 are connected to the plurality of frequency conversion units 23-1 to 23-m. For example, the output port of the demultiplexer 22 corresponding to the frequency $f_{T1}$ is connected to the frequency conversion unit 23-1, the output port of the demultiplexer 22 corresponding to the frequency $f_{Ti}$ is connected to the frequency conversion unit 23-i, and the output port of the demultiplexer 22 corresponding to the frequency $f_{Tm}$ is connected to the frequency conversion unit 23-m. Therefore, the electrical signal demultiplexed for each frequency by the demultiplexer 22 is output to the frequency conversion unit 23 connected to the output port corresponding to the frequency. In FIG. 2, the electrical signal having the frequency $f_{Ti}$ is demultiplexed by the demultiplexer 22 and is input to the frequency conversion unit 23-i.

The frequency conversion unit 23-i converts the frequency of the input electrical signal into a frequency in the RF band (step S107). The frequency conversion unit 23-i outputs the electrical signal in the RF band to the antenna 24-i. The antenna 24-i radiates a wireless signal corresponding to the input electrical signal (step S108). The wireless signal radiated by the antenna 24-i is subjected to beamforming by the lens/reflector 25 in a direction corresponding to the frequency. The m frequencies $f_{T1}, \ldots,$ and $f_{Tm}$ have one-to-one correspondence with the in antennas 24 and m transmission beams. Therefore, directions of the transmission beams can be switched by switching the frequency of the transmission signal of the exchange device 10.

According to the wireless communication system 1 configured as described above, a frequency is allocated to the antenna 24 that radiates a wireless signal to the reflector or lens included in the base station device 20. Thus, it is possible to select the antenna 24 that radiates a wireless signal to the reflector or the lens by switching a frequency of a transmission signal in the exchange device 10. This makes it possible to remotely switch a direction of a transmission beam. Such a configuration does not use a wavelength for beamforming control. Therefore, it is possible to perform beamforming control of the antennas while suppressing a decrease in wavelength utilization efficiency.

Modification Example of First Embodiment

The exchange device 10 may form multiple beams in the base station device 20 by simultaneously using a plurality of frequencies to perform subcarrier multiplexing (SCM).

Second Embodiment

A second embodiment is different from the first embodiment in that an exchange device controls an optical wavelength and a frequency to remotely control beamforming in a base station device. In the second embodiment, differences from the first embodiment will be mainly described.

Figure 3:
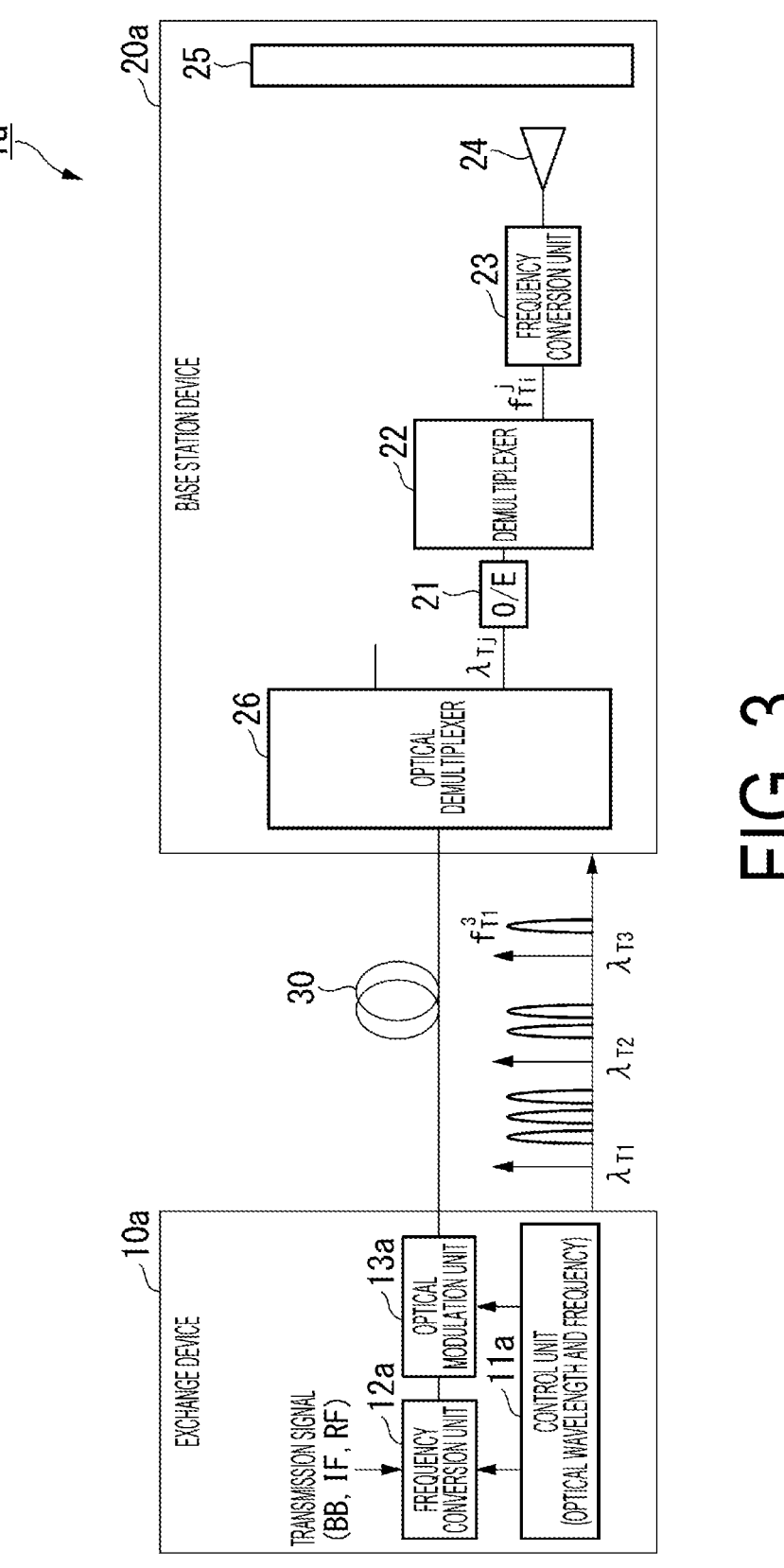
FIG. 3 illustrates a configuration example of a wireless communication system according to a second embodiment.

FIG. 3 illustrates a configuration example of a wireless communication system 1a according to the second embodiment. The wireless communication system 1a includes an exchange device 10a and a base station device 20a. The exchange device 10a and the base station device 20a are connected via an optical transmission line 30.

The exchange device 10a includes a control unit 11a, a frequency conversion unit 12, and an optical modulation unit 13a.

The control unit 11a selects a frequency and an optical wavelength according to a direction in which a beam is to be formed in the base station device 20a. For example, the control unit 11a selects one or more of applicable optical wavelengths $\lambda_{T1}, \ldots,$ and $\lambda_{Tn}$ as the optical wavelength to be used by the optical modulation unit 13a. For example, the control unit 11a selects one or more of frequencies $f^{j}_{T1}, \ldots,$ and $f^{j}_{Tmj}$ applicable to optical wavelengths $\lambda_{T1}, \ldots,$ and $\lambda_{Tn}$. Here, j is an integer of 1 or more.

The frequency conversion unit 12a converts a frequency of an input transmission signal into a frequency $f^{j}_{Ti}$ designated by the control unit 11a.

The optical modulation unit 13a modulates an intensity of an optical signal having the certain wavelength $\lambda_{Tj}$ designated by the control unit 11a by using the signal having the frequency $f^{j}_{Ti}$. Thus, the optical modulation unit 13a generates an optically modulated signal having the wavelength $\lambda_{Tj}$. The optical modulation unit 13a transmits the generated optically modulated signal to the base station device 20a via the optical transmission line 30.

The base station device 20a includes an optical demultiplexer 26, a plurality of O/Es 21, a plurality of demultiplexers 22, a plurality of frequency conversion units 23, a plurality of antennas 24, and a lens/reflector 25. Although not illustrated in FIG. 3 for simplification of description, the O/Es 21 and the demultiplexers 22 need to be provided for the number n of optical wavelengths $\lambda_T$, and the frequency conversion units 23 need to be provided for the number $m_j$ of frequencies used by the optical wavelength $\lambda_{Tj}$. Therefore, the antennas 24 need to be provided for the total number $\Sigma^{n}_{j=1}m_j$ of combinations of the optical wavelength and the frequency to be used.

The optical demultiplexer 26 demultiplexes the optically modulated signal received via the optical transmission line 30 according to the wavelength. For example, the optical demultiplexer 26 is an arrayed waveguide grating (AWG). The optically modulated signal demultiplexed by the optical demultiplexer 26 is input to the O/E 21.

Here, $\Sigma^{n}_{j=1}m_j$ combinations of the optical wavelength $\lambda_{Tj}$ and the frequency $f^{j}_{Ti}$ have one-to-one correspondence with the $\Sigma^{n}_{j=1}m_j$ antennas 24 and $\Sigma^{n}_{j=1}m_j$ transmission beams. Thus, transmission beam directions can be switched by switching the optical wavelength and frequency of the transmission signal of the exchange device 10a.

Figure 4:
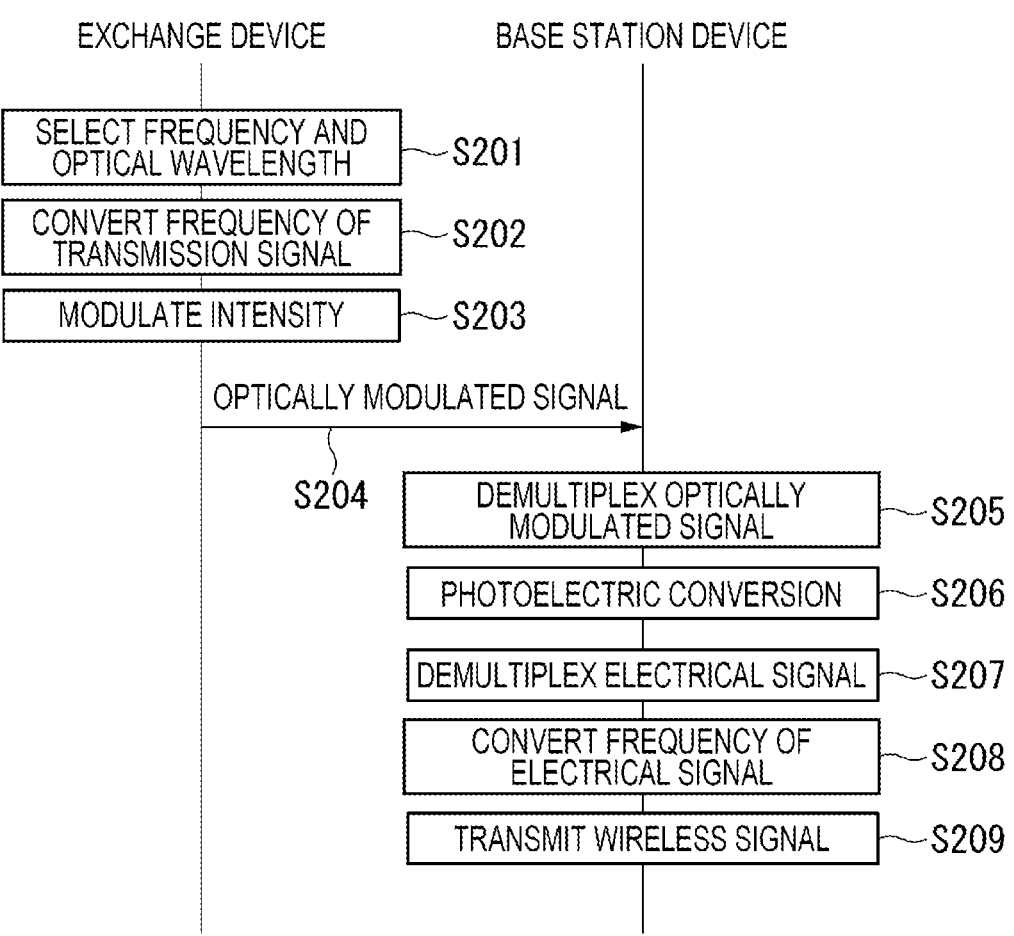
FIG. 4 is a sequence diagram illustrating a flow of processing of the wireless communication system according to the second embodiment.

FIG. 4 is a sequence diagram illustrating a flow of processing of the wireless communication system 1a according to the second embodiment.

The control unit 11a selects a frequency and an optical wavelength according to a direction in which a beam is to be formed in the base station device 20a (step S201). For example, the control unit 11a selects one frequency $f^{j}_{Ti}$ from the frequencies $f^{j}_{T1}, \ldots,$ and $f^{j}_{Tmj}$. Further, the control unit 11a selects one optical wavelength $\lambda_{Tj}$ from the optical wavelengths $\lambda_{T1}, \ldots,$ and $\lambda_{Tn}$. The control unit 11a controls the frequency conversion unit 12a so as to convert a frequency into the selected frequency $f^{j}_{Ti}$. Further, the control unit 11a controls the optical modulation unit 13a so as to modulate a light intensity by using the selected optical wavelength $\lambda_{Tj}$.

The frequency conversion unit 12a converts a frequency of an input transmission signal into the frequency $f^{j}_{Ti}$ designated by the control unit 11a (step S202). The frequency conversion unit 12a outputs the transmission signal having the frequency $f^{j}_{Ti}$ to the optical modulation unit 13a. The optical modulation unit 13a modulates an intensity with respect to the optical wavelength $\lambda_{Tj}$ designated by the control unit 11a by using the transmission signal having the frequency $f'_{Ti}$ output from the frequency conversion unit 12a (step S203). Thus, the optical modulation unit 13a generates an optically modulated signal having the optical wavelength $\lambda_{Tj}$. The optical modulation unit 13a transmits the generated optically modulated signal to the optical transmission line 30 (step S204).

The optically modulated signal transmitted to the optical transmission line 30 is input to the base station device 20a. The optical demultiplexer 26 of the base station device 20a demultiplexes the input optically modulated signal having the optical wavelength $\lambda_{Tj}$ (step S205). The O/Es 21 are connected to output ports of the optical demultiplexer 26 according to the number of optical wavelengths. Therefore, the optically modulated signal demultiplexed for each wavelength by the optical demultiplexer 26 is output to the O/E 21 connected to the output port corresponding to the wavelength. In FIG. 4, the optically modulated signal having the optical wavelength $\lambda_{Tj}$ is demultiplexed by the optical demultiplexer 26 and is input to the O/E 21.

The O/E 21 converts the input optically modulated signal into an electrical signal (step S206). By this processing, the optically modulated signal is converted into an electrical signal having the frequency $f'_{Ti}$. Therefore, the O/E 21 outputs the electrical signal having the frequency $f'_{Ti}$ to the demultiplexer 22. The electrical signal having the frequency $f'_{Ti}$ output to the demultiplexer 22 is demultiplexed according to the frequency (step S207). The electrical signal demultiplexed by the demultiplexer 22 is input to the frequency conversion unit 23.

The frequency conversion unit 23 converts the frequency of the input electrical signal into a frequency in the RF band (step S208). The frequency conversion unit 23 outputs the electrical signal in the RF band to the antenna 24. The antenna 24 radiates a wireless signal corresponding to the input electrical signal (step S209). The wireless signal radiated by the antenna 24 is subjected to beamforming by the lens/reflector 25 in a direction corresponding to the frequency.

According to the wireless communication system 1a configured as described above, the number of antennas 24 corresponding to combinations of the frequency and the optical wavelength is provided in the base station device 20a. Thus, it is possible to select the antenna 24 that radiates a wireless signal to the reflector or the lens by switching a frequency and optical wavelength of a transmission signal in the exchange device 10a. This makes it possible to remotely switch a direction of a transmission beam. Such a configuration does not use a wavelength for beamforming control. Therefore, it is possible to perform beamforming control of the antennas while suppressing a decrease in wavelength utilization efficiency.

Modification Example of Second Embodiment

The exchange device 10a may form multiple beams in the base station device 20a by simultaneously using a plurality of optical wavelengths and a plurality of frequencies to perform subcarrier multiplexing and wavelength division multiplexing (WDM).

Third Embodiment

A third embodiment is different from the first embodiment in that an exchange device controls an optical polarization and frequency of a transmission signal to remotely control beamforming in a base station device. In the second embodiment, differences from the first embodiment will be mainly described.

Figure 5:
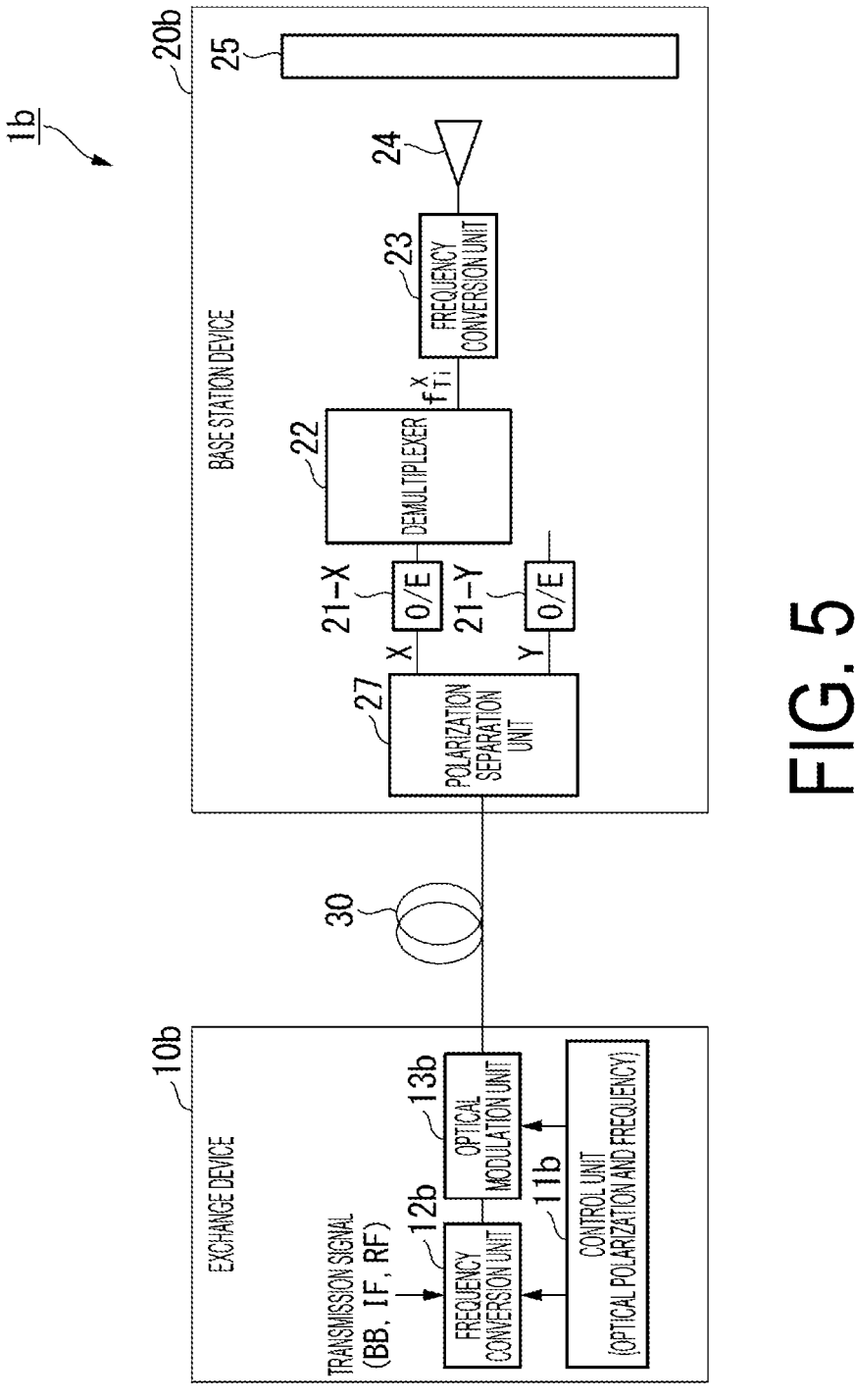
FIG. 5 illustrates a configuration example of a wireless communication system according to a third embodiment.

FIG. 5 illustrates a configuration example of a wireless communication system 1b according to the third embodiment. The wireless communication system 1b includes an exchange device 10b and a base station device 20b. The exchange device 10b and the base station device 20b are connected via an optical transmission line 30.

The exchange device 10b includes a control unit 11b, a frequency conversion unit 12b, and an optical modulation unit 13b.

The control unit 11b selects a frequency and an optical polarization according to a direction in which a beam is to be formed in the base station device 20b. For example, the control unit 11b selects one or more of applicable optical polarizations X and Y as the optical polarization to be used by the optical modulation unit 13b. Here, X and Y represent horizontal polarization and vertical polarization, respectively. For example, the control unit 11b selects one or more of frequencies $f^k_{T1}, \ldots,$ and $f^k_{Tmk}$ applicable to an optical polarization k (k is X or Y).

The frequency conversion unit 12b converts a frequency of an input transmission signal into a frequency $f^k_{Ti}$ designated by the control unit 11b.

The optical modulation unit 13b modulates an intensity of an optical signal having the certain optical polarization k designated by the control unit 11b by using the signal having the frequency $f^k_{Ti}$. Thus, the optical modulation unit 13b generates an optically modulated signal having the optical polarization k. The optical modulation unit 13b transmits the generated optically modulated signal to the base station device 20b via the optical transmission line 30.

The base station device 20b includes a polarization separation unit 27, a plurality of O/Es 21-X and 21-Y, a plurality of demultiplexers 22, a plurality of frequency conversion units 23, a plurality of antennas 24, and a lens/reflector 25. Although not illustrated in FIG. 5 for simplification of description, the demultiplexers 22 need to be provided for the number of (e.g. two) optical polarizations, and the frequency conversion units 23 need to be provided for the total number $(m_X+m_Y)$ of the number $m_x$ of frequencies used by the optical polarization X and the number $m_y$ of frequencies used by the optical polarization Y. The plurality of antennas 24 need to be provided for the total number $(m_X+m_Y)$ of combinations of the optical polarization and the frequency to be used.

The polarization separation unit 27 separates an optical polarization k component of the optically modulated signal received via the optical transmission line 30.

Here, $(m_X+m_Y)$ combinations of the optical polarization k and the frequency $f^k_{Ti}$ have one-to-one correspondence with the $(m_X+m_Y)$ antennas 24 and $(m_X+m_Y)$ transmission beams. Thus, transmission beam directions can be switched by switching the optical polarization and frequency of the transmission signal of the exchange device 10b.

Figure 6:
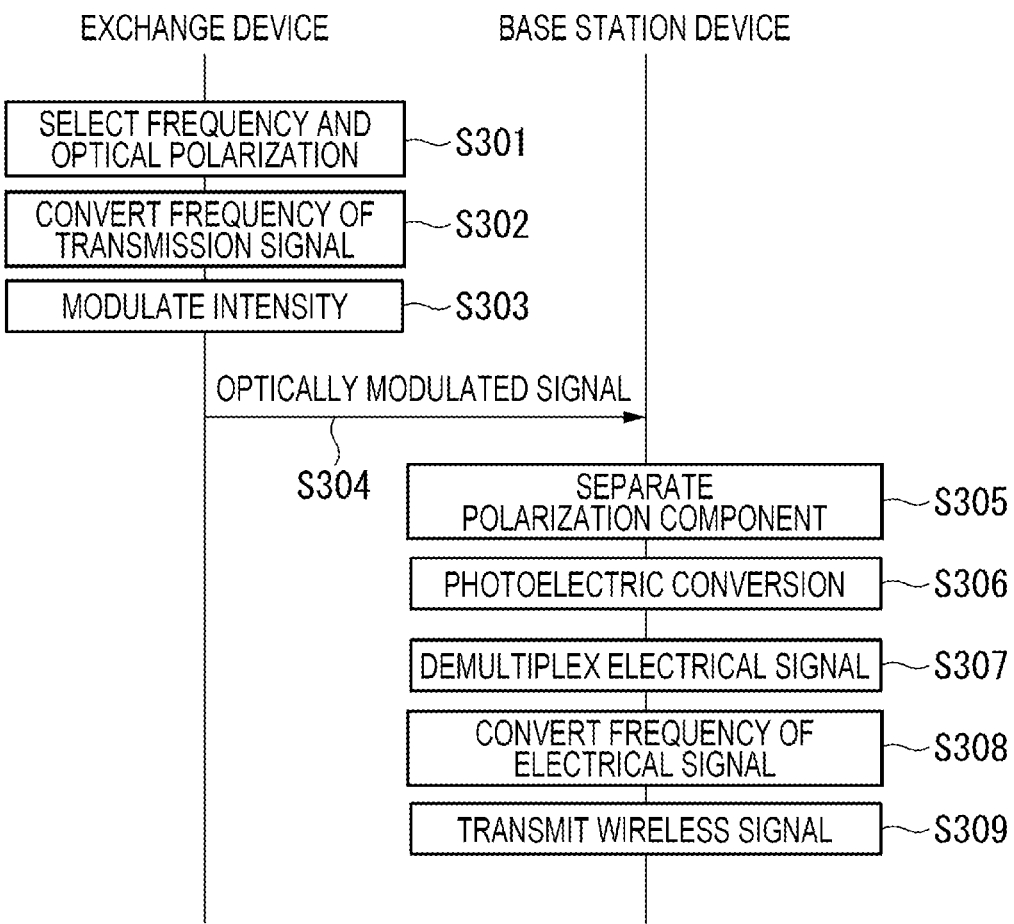
FIG. 6 is a sequence diagram illustrating a flow of processing of the wireless communication system according to the third embodiment.

FIG. 6 is a sequence diagram illustrating a flow of processing of the wireless communication system 1b according to the third embodiment.

The control unit 11b selects a frequency and an optical polarization according to a direction in which a beam is to be formed in the base station device 20b (step S301). For example, the control unit 11b selects one frequency $f^X_{Ti}$ from frequencies $f^X_{T1}, \ldots,$ and $f^X_{Tmj}$. Further, the control unit 11b selects one optical polarization X from the optical polarizations k. The control unit 11b controls the frequency conversion unit 12b so as to convert a frequency into the selected frequency $f^X_{Ti}$. Further, the control unit 11b controls the optical modulation unit 13b so as to modulate a light intensity of an optical signal having the selected optical polarization X.

The frequency conversion unit 12b converts a frequency of an input transmission signal into the frequency $f^X_{Ti}$ designated by the control unit 11b (step S302). The frequency conversion unit 12b outputs the transmission signal having the frequency $f^X_{Ti}$ to the optical modulation unit 13b. The optical modulation unit 13b modulates an intensity of the optical signal having the optical polarization X designated by the control unit 11b by using the transmission signal having the frequency $f^X_{Ti}$ output from the frequency conversion unit 12b (step S303). Thus, the optical modulation unit 13b generates an optically modulated signal having the optical polarization X. The optical modulation unit 13a transmits the generated optically modulated signal to the optical transmission line 30 (step S304).

The optically modulated signal transmitted to the optical transmission line 30 is input to the base station device 20b. The polarization separation unit 27 of the base station device 20b separates an optical polarization k component of the optically modulated signal having the input optical polarization X (step S305). The O/Es 21-X and 21-Y are connected to output ports of the polarization separation unit 27 according to the number of optical polarizations. Therefore, the optically modulated signal separated by the polarization separation unit 27 is output to the O/E 21-X or 21-Y connected to the output port corresponding to the optical polarization component. In FIG. 6, the optically modulated signal having the optical polarization X is separated by the polarization separation unit 27 and is input to the O/E 21-X.

The O/E 21-X converts the input optically modulated signal into an electrical signal (step S306). By this processing, the optically modulated signal is converted into an electrical signal having the frequency $f^X_{Ti}$. Therefore, the O/i 21-X outputs the electrical signal having the frequency $f^X_{Ti}$ to the demultiplexer 22. The electrical signal having the frequency $f^X_{Ti}$ output to the demultiplexer 22 is demultiplexed according to the frequency (step S307). The electrical signal demultiplexed by the demultiplexer 22 is input to the frequency conversion unit 23.

The frequency conversion unit 23 converts the frequency of the input electrical signal into a frequency in the RF band (step S308). The frequency conversion unit 23 outputs the electrical signal in the RF band to the antenna 24. The antenna 24 radiates a wireless signal corresponding to the input electrical signal (step S309). The wireless signal radiated by the antenna 24 is subjected to beamforming by the lens/reflector 25 in a direction corresponding to the frequency.

According to the wireless communication system 1b configured as described above, the number of antennas 24 corresponding to combinations of the frequency and the optical polarization is provided in the base station device 20b. Thus, it is possible to select the antenna 24 that radiates a wireless signal to the reflector or the lens by switching a frequency and optical polarization of a transmission signal in the exchange device 10b. This makes it possible to remotely switch a direction of a transmission beam. Such a configuration does not use a wavelength for beamforming control. Therefore, it is possible to perform beamforming control of the antennas while suppressing a decrease in wavelength utilization efficiency.

Modification Example of Third Embodiment

The exchange device 10b may form multiple beams in the base station device 20b by simultaneously using a plurality of optical polarizations and a plurality of frequencies to perform subcarrier multiplexing and polarization division multiplexing (PDM).

Fourth Embodiment

A fourth embodiment is different from the first embodiment in that an exchange device controls an optical wavelength and optical polarization of a transmission signal to remotely control beamforming in a base station device. In the fourth embodiment, differences from the first embodiment will be mainly described.

Figure 7:
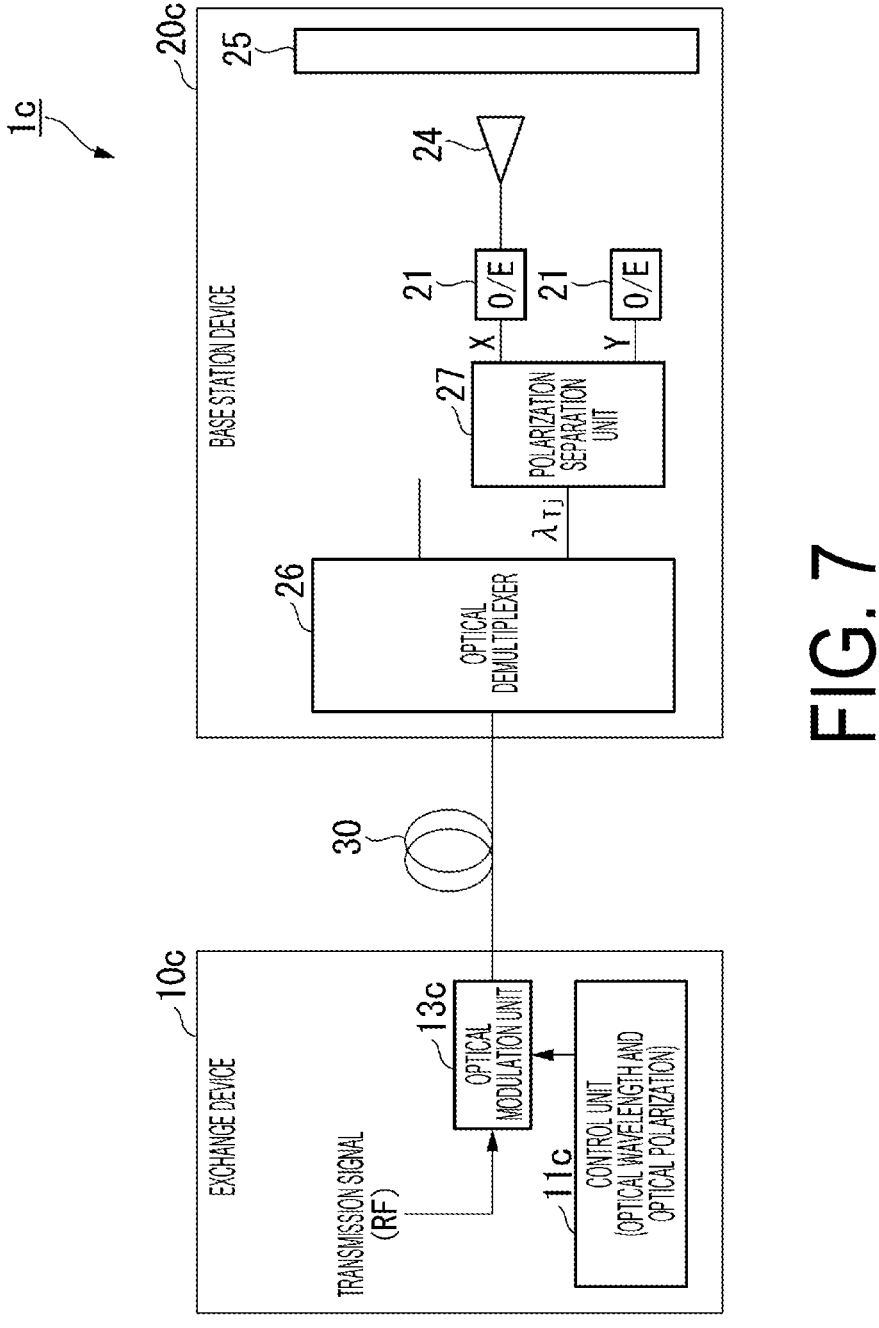
FIG. 7 illustrates a configuration example of a wireless communication system according to a fourth embodiment.

FIG. 7 illustrates a configuration example of a wireless communication system 1c according to the fourth embodiment. The wireless communication system 1c includes an exchange device 10c and a base station device 20c. The exchange device 10c and the base station device 20c are connected via an optical transmission line 30.

The exchange device 10c includes a control unit 11c and an optical modulation unit 13c.

The control unit 11c selects a frequency and an optical polarization according to a direction in which a beam is to be formed in the base station device 20c. For example, the control unit 11c selects one or more of applicable optical polarizations X and Y as the optical polarization to be used by the optical modulation unit 13b. For example, the control unit 11c selects one or more of applicable optical wavelengths $\lambda_{T1}, \ldots,$ and $\lambda_{Tn}$ as the optical wavelength to be used by the optical modulation unit 13c.

The optical modulation unit 13c modulates an intensity of a transmission signal in the RF band by using an optical signal having an optical polarization k having a certain optical wavelength $\lambda_{Tj}$. Thus, the optical modulation unit 13c generates an optically modulated signal having the optical polarization k having the optical wavelength $\lambda_{Tj}$. The optical modulation unit 13c transmits the generated optically modulated signal to the base station device 20c via the optical transmission line 30.

The base station device 20c includes an optical demultiplexer 26, a plurality of polarization separation units 27, a plurality of O/Es 21, a plurality of antennas 24, and a lens/reflector 25. Although not illustrated in FIG. 7 for simplification of description, the polarization separation units 27 need to be provided for the number n of optical wavelengths $\lambda_T$, and the O/Es 21 need to be provided for the number of (e.g. two) optical polarizations used by the optical wavelength $\lambda_{Tj}$. The antennas 24 need to be provided for the total number 2n of combinations of the optical wavelength and the optical polarization to be used.

The optical demultiplexer 26 demultiplexes the optically modulated signal received via the optical transmission line 30 according to the wavelength. For example, the optical demultiplexer 26 is an AWG. The optically modulated signal demultiplexed by the optical demultiplexer 26 is input to the polarization separation unit 27.

The polarization separation unit 27 separates an optical polarization k component of the optically modulated signal output from the optical demultiplexer 26.

Here, 2n combinations of the optical wavelength $\lambda_{Tj}$ and the optical polarization k have one-to-one correspondence with the 2n antennas 24 and 2n transmission beams. Thus, transmission beam directions can be switched by switching the optical polarization and optical wavelength of the transmission signal of the exchange device 10c.

Figure 8:
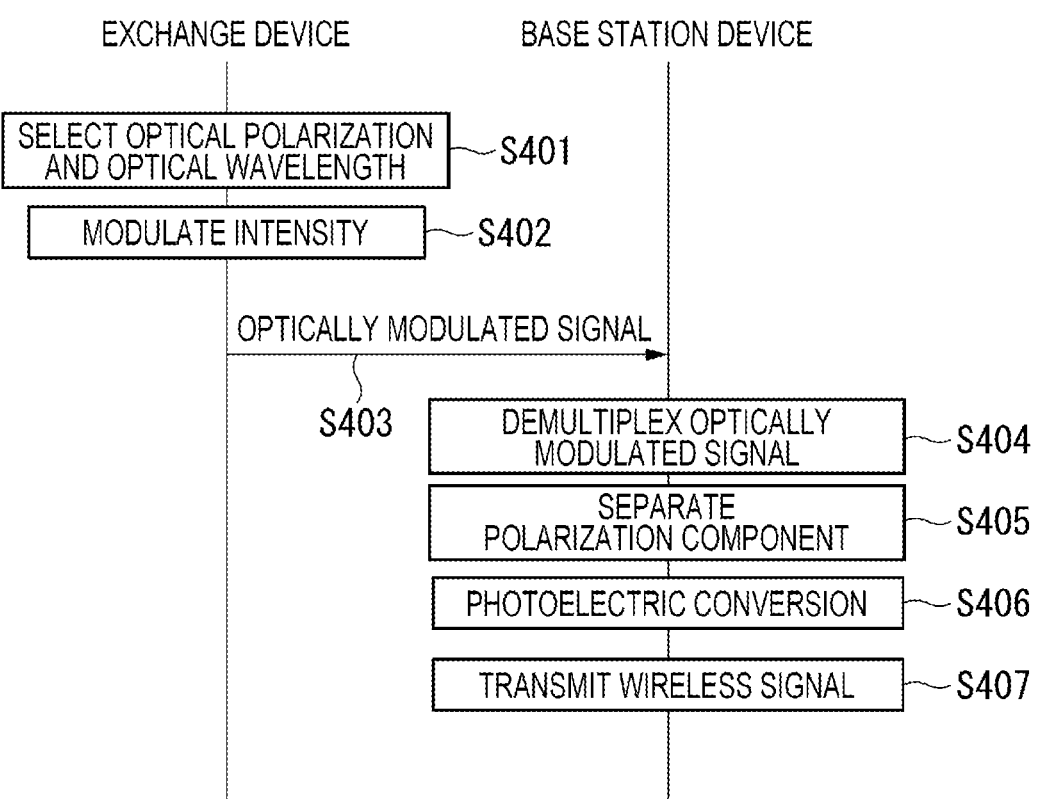
FIG. 8 is a sequence diagram illustrating a flow of processing of the wireless communication system according to the fourth embodiment.

FIG. 8 is a sequence diagram illustrating a flow of processing of the wireless communication system 1c according to the fourth embodiment.

The control unit 11c selects an optical polarization and an optical wavelength according to a direction in which a beam is to be formed in the base station device 20c (step S401). For example, the control unit 11c selects one optical wavelength $\lambda_{Tj}$ from the optical wavelengths $\lambda_{T1}, \ldots,$ and $\lambda_{Tn}$. Further, the control unit 11c selects one optical polarization X from the optical polarizations k. The control unit 11c controls the optical modulation unit 13c so as to modulate a light intensity of an optical signal having the optical polarization X having the selected optical wavelength $\lambda_{Tj}$.

The optical modulation unit 13c modulates an intensity of a transmission signal by using an optical signal having the optical polarization X having the optical wavelength $\lambda_{Tj}$ designated by the control unit 11c (step S402). Thus, the optical modulation unit 13c generates an optically modulated signal having the optical polarization X having the optical wavelength $\lambda_{Tj}$. The optical modulation unit 13c transmits the generated optically modulated signal to the optical transmission line 30 (step S403).

The optically modulated signal transmitted to the optical transmission line 30 is input to the base station device 20c. The optical demultiplexer 26 of the base station device 20c demultiplexes the input optically modulated signal according to the wavelength (step S404). The polarization separation units 27 are connected to output ports of the optical demultiplexer 26 according to the number of wavelengths. Therefore, the optically modulated signal demultiplexed by the optical demultiplexer 26 is output to the polarization separation unit 27 connected to the output port corresponding to the wavelength. In FIG. 8, the optically modulated signal having the optical wavelength $\lambda_{Tj}$ is demultiplexed by the optical demultiplexer 26 and is input to the polarization separation unit 27 connected to the output port corresponding to the optical wavelength $\lambda_{Tj}$.

The polarization separation unit 27 separates an optical polarization k component of the optically modulated signal having the optical polarization X (step S405). The O/Es 21 are connected to output ports of the polarization separation units 27 according to the number of optical polarizations. Therefore, the optically modulated signal separated by the polarization separation unit 27 is output to the O/E 21 connected to the output port corresponding to the optical polarization component. In FIG. 8, the optically modulated signal having the optical polarization X is separated by the polarization separation unit 27 and is input to the O/E 21 connected to the output port of the optical polarization X.

The O/E 21 converts the input optically modulated signal into an electrical signal (step S406). By this processing, the optically modulated signal is converted into an electrical signal. The O/E 21 outputs the converted electrical signal to the antenna 24. The antenna 24 radiates a wireless signal corresponding to the input electrical signal (step S407).

According to the wireless communication system 1c configured as described above, the number of antennas 24 corresponding to combinations of the optical wavelength and the optical polarization is provided in the base station device 20c. Thus, it is possible to select the antenna 24 that radiates a wireless signal to the reflector or the lens by switching a frequency and optical polarization of a transmission signal in the exchange device 10c. This makes it possible to remotely switch a direction of a transmission beam. Such a configuration does not use a wavelength for beamforming control. Therefore, it is possible to perform beamforming control of the antennas while suppressing a decrease in wavelength utilization efficiency.

Modification Example of Fourth Embodiment

The exchange device 10c may form multiple beams in the base station device 20c by simultaneously using a plurality of optical polarizations and a plurality of optical wavelengths to perform wavelength division multiplexing and polarization division multiplexing.

Figure 9:
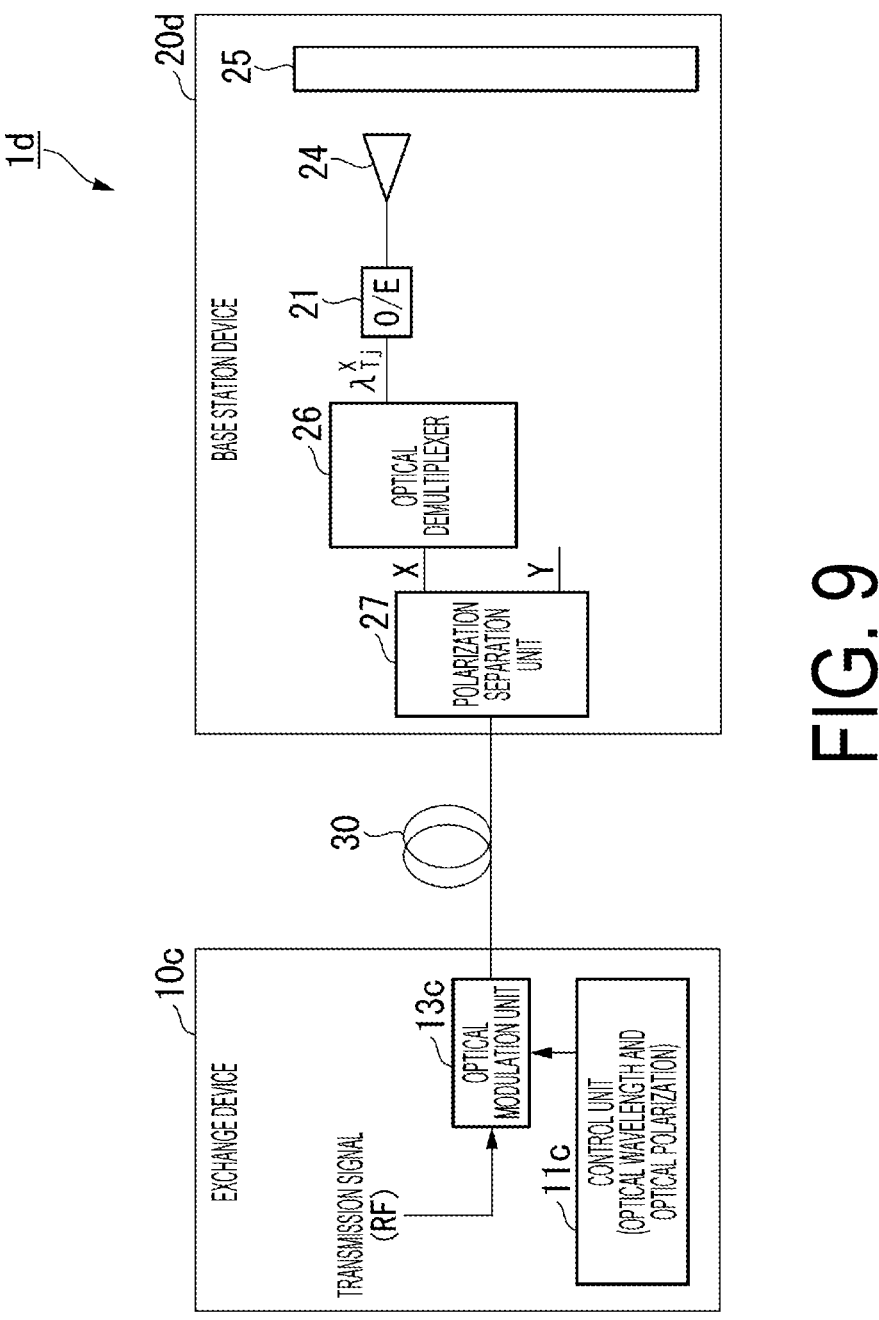
FIG. 9 illustrates a configuration example of a wireless communication system according to a modification example of the fourth embodiment.

In the configuration of the base station device 20c in FIG. 7, the order of the optical demultiplexer 26 and the polarization separation unit 27 may be switched as illustrated in FIG. 9. FIG. 9 illustrates a configuration example of a wireless communication system 1d according to a modification example of the fourth embodiment. The wireless communication system 1d includes the exchange device 10c and a base station device 20d. The exchange device 10c and the base station device 20d are connected via the optical transmission line 30. The wireless communication system 1d in FIG. 9 is different from the wireless communication system 1c in FIG. 7 in a configuration of the base station device 20d. Other configurations of the wireless communication system 1d are similar to those of the wireless communication system 1c.

The base station device 20d includes a polarization separation unit 27, an optical demultiplexer 26, a plurality of O/Es 21, a plurality of antennas 24, and a lens/reflector 25. Although not illustrated in FIG. 9 for simplification of description, the optical demultiplexers 26 need to be provided for the number of (e.g. two) optical polarizations, and the O/Es 21 need to be provided for the total number $(m_X + m_Y)$ of the number of frequencies $m_X$ used by the optical polarization X and the number of frequencies $m_Y$ used by the optical polarization Y. The antennas 24 need to be provided for the total number $(m_X + m_Y)$ of combinations of the optical polarization and the optical wavelength to be used.

Here, $(m_X + m_Y)$ combinations of the optical polarization k and the optical wavelength $\lambda_{Tj}$ have one-to-one correspondence with the $(m_X + m_Y)$ antennas 24 and $(m_X + m_Y)$ transmission beams. Thus, transmission beam directions can be switched by switching the optical polarization and optical wavelength of the transmission signal of the exchange device 10c.

The base station device 20c in FIG. 7 demultiplexes the optically modulated signal received via the optical transmission line 30 and then separates the optical polarization k component, whereas the base station device 20d separates the optical polarization k component of the optically modulated signal received via the optical transmission line 30 and then demultiplexes the optically modulated signal.

Fifth Embodiment

In the first to fourth embodiments, the configurations of signal transmission in the downstream direction have been described. In a fifth embodiment, a configuration of signal transmission in the upstream direction will be described. In the fifth embodiment, a configuration in which a base station device performs subcarrier multiplexing and transmits a signal to an exchange device will be described.

Figure 10:
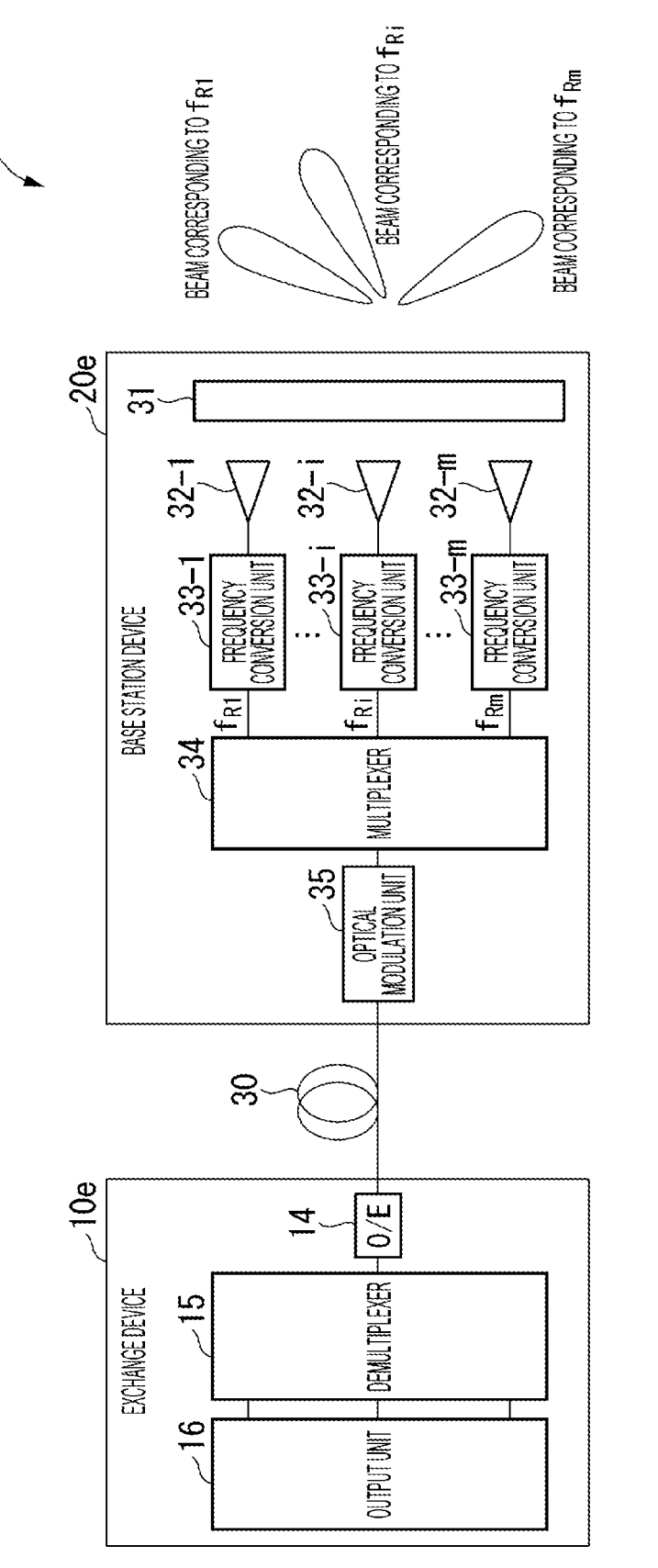
FIG. 10 illustrates a configuration example of a wireless communication system according to a fifth embodiment.

FIG. 10 illustrates a configuration example of a wireless communication system 1e according to the fifth embodiment. The wireless communication system 1c includes an exchange device 10e and a base station device 20e. The exchange device 10e and the base station device 20e are connected via an optical transmission line 30.

The base station device 20e includes an array 31, a plurality of antennas 32-1 to 32-m, a plurality of frequency conversion units 33-1 to 33-m, a multiplexer 34, and an optical modulation unit 35.

The antennas 32-1 to 32-m receive wireless signals transmitted from an external device via the array 31. The external device is, for example, a wireless device with which the base station device 20*e* performs communication. The antennas 32-1 to 32-*m* convert the received wireless signals into electrical signals and output the electrical signals to the frequency conversion units 33-1 to 33-*m*.

The frequency conversion units 33-1 to 33-*m* convert frequencies of the input electrical signals. Therefore, the electrical signals input to the frequency conversion units 33-1 to 33-*m* am converted into signals having a frequency $f_{Ri}$.

The multiplexer 34 multiplexes the electrical signals output from the frequency conversion units 33-1 to 33-*m*.

The optical modulation unit 35 performs subcarrier multiplexing by modulating an intensity of an optical signal having a certain wavelength by using the electrical signal multiplexed by the multiplexer 34. Thus, the optical modulation unit 35 generates a multiplexed signal. The optical modulation unit 35 transmits the generated multiplexed signal to the exchange device 10*e* via the optical transmission line 30.

The exchange device 10*e* includes an O/E 14, a demultiplexer 15, and an output unit 16.

The O/E 14 is a photoelectric conversion unit that converts the multiplexed signal received via the optical transmission line 30 into an electrical signal.

The demultiplexer 15 demultiplexes the electrical signal output by the O/E 14 according to the frequency. For example, the demultiplexer 15 demultiplexes the electrical signal into electrical signals having frequencies $f_{R1}, \ldots,$ and $f_{Rm}$.

The output unit 16 demodulates the input electrical signals having the frequencies $f_{R1}, \ldots,$ and $f_{Rm}$. For example, the output unit 16 may select and demodulate one of the input electrical signals having the frequencies $f_{R1}, \ldots,$ and $f_{Rm}$. This is equivalent to selecting one beam from the m received beams. The output unit 16 can also form multiple beams by selecting and simultaneously using a plurality of frequencies. The output unit 16 may perform multiple input multiple output (MIMO) signal processing after demodulating more than one of the input electrical signals having the frequencies $f_{R1}, \ldots,$ and $f_{Rm}$.

Figure 11:
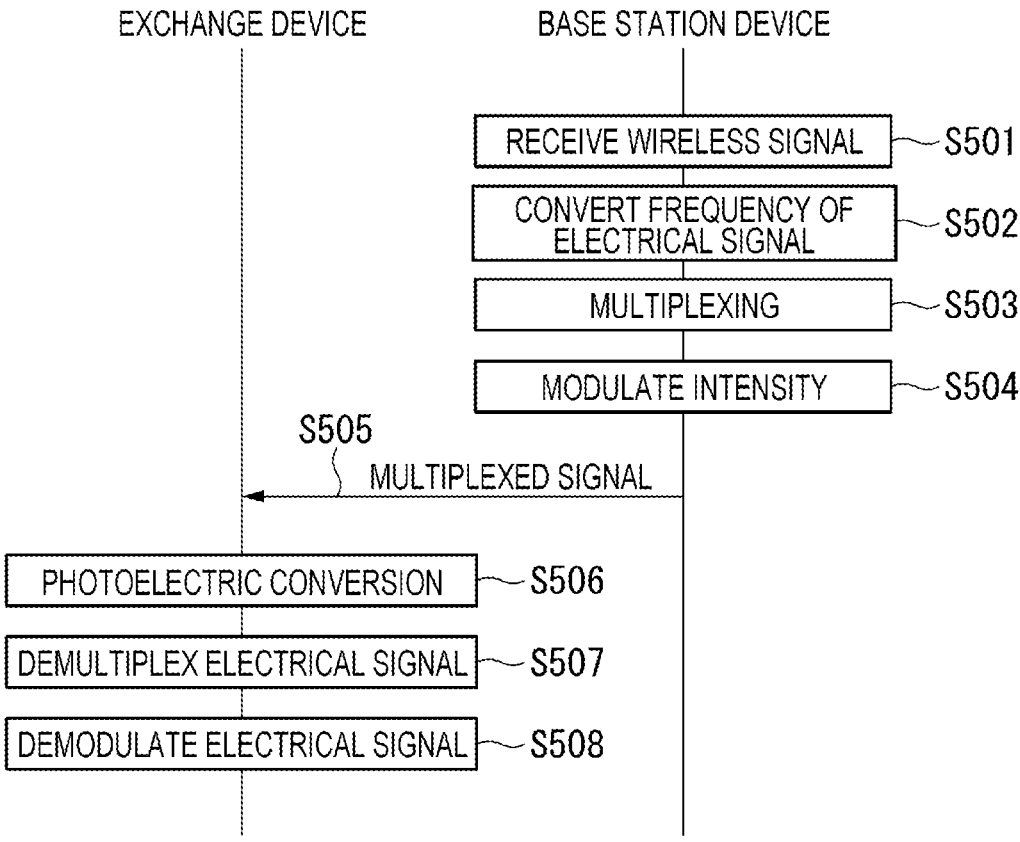
FIG. 11 is a sequence diagram illustrating a flow of processing of the wireless communication system according to the fifth embodiment.

FIG. 11 is a sequence diagram illustrating a flow of processing of the wireless communication system 1*e* according to the fifth embodiment.

The antenna 32 receives a wireless signal transmitted from an external device via the array 31 (step S501). The antenna 32 converts the received wireless signal into an electrical signal and outputs the electrical signal to the frequency conversion unit 33. In FIG. 11, for example, the electrical signal is output from the antenna 32-*i*.

The frequency conversion unit 33 connected to the antenna 32-*i* converts a frequency of the electrical signal output from the antenna 32-*i* (step S502). Therefore, the frequency of the electrical signal is converted into the frequency $f_{Ri}$. The frequency conversion unit 33 outputs the electrical signal having the frequency $f_{Ri}$ to the multiplexer 34. The multiplexer 34 multiplexes the electrical signal output from each frequency conversion unit 33 (step S503). The electrical signal multiplexed by the multiplexer 34 is output to the optical modulation unit 35.

The optical modulation unit 35 performs subcarrier multiplexing by modulating an intensity of an optical signal having a certain wavelength by using the electrical signal multiplexed by the multiplexer 34 (step S504). Thus, the optical modulation unit 35 generates a multiplexed signal. The optical modulation unit 35 transmits the generated multiplexed signal to the exchange device 10*e* via the optical transmission line 30 (step S505).

The multiplexed signal transmitted to the optical transmission line 30 is input to the exchange device 10*e*. The O/E 14 of the exchange device 10*e* converts the input multiplexed signal into an electrical signal (step S506). By this processing, the multiplexed signal is converted into an electrical signal having the frequency $f_{Ri}$. The O/E 14 outputs the electrical signal having the frequency $f_{Ri}$ to the demultiplexer 15. The electrical signal having the frequency $f_{Ri}$ output to the demultiplexer 15 is demultiplexed according to the frequency (step S507). The electrical signal having the frequency $f_{Ri}$ demultiplexed by the demultiplexer 15 is input to the output unit 16. The output unit 16 demodulates the input electrical signal having the frequency $f_{Ri}$ (step S508).

According to the wireless communication system 1*e* configured as described above, effects similar to those of the first embodiment can be obtained also in the upstream direction.

Sixth Embodiment

A sixth embodiment is different from the fifth embodiment in that a base station device performs subcarrier multiplexing and wavelength division multiplexing and transmits a signal to an exchange device. In the sixth embodiment, differences from the fifth embodiment will be mainly described.

Figure 12:
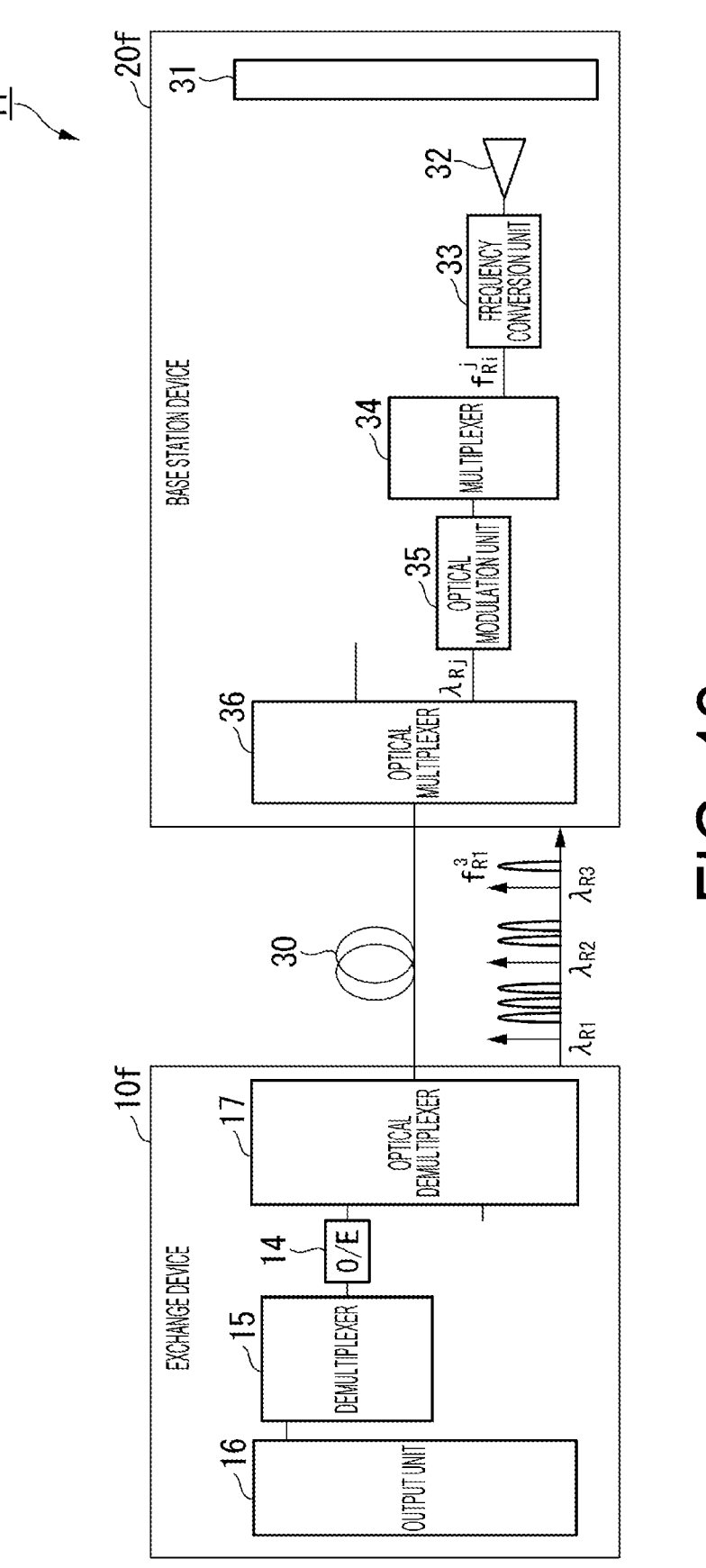
FIG. 12 illustrates a configuration example of a wireless communication system according to a sixth embodiment.

FIG. 12 illustrates a configuration example of a wireless communication system 1*f* according to the sixth embodiment. The wireless communication system 1*f* includes an exchange device 10*f* and a base station device 20*f*. The exchange device 10*f* and the base station device 20*f* are connected via an optical transmission line 30.

The base station device 20*f* includes an array 31, a plurality of antennas 32, a plurality of frequency conversion units 33, a plurality of multiplexers 34, a plurality of optical modulation units 35, and an optical multiplexer 36. Although not illustrated in FIG. 12 for simplification of description, the multiplexers 34 and the optical modulation units 35 need to be provided for the number n of optical wavelengths $\lambda_R$, and the frequency conversion units 33 need to be provided for the number $m_j$ of frequencies used by an optical wavelength $\lambda_{Rj}$. Therefore, the antennas 32 need to be provided for the total number $\Sigma^n_{j=1} m_j$ of combinations of the optical wavelength and the frequency to be used.

The optical multiplexer 36 multiplexes signals subjected to subcarrier multiplexing by the optical modulation units 35 and performs wavelength division multiplexing. Thus, the optical multiplexer 36 generates a wavelength-division multiplexed signal. The optical multiplexer 36 transmits the generated wavelength-division multiplexed signal to the exchange device 10*f* via the optical transmission line 30.

The exchange device 10*f* includes an optical demultiplexer 17, a plurality of O/Es 14, a plurality of demultiplexers 15, and an output unit 16. Although not illustrated in FIG. 3 for simplification of description, the O/Es 14 and the demultiplexers 15 need to be provided for the number n of optical wavelengths $\lambda_R$.

The optical demultiplexer 17 demultiplexes the wavelength-division multiplexed signal received via the optical transmission line 30 according to the wavelength. For example, the optical demultiplexer 17 is an AWG. The multiplexed signal demultiplexed by the optical demultiplexer 17 is input to the O/E 14.

Figure 13:
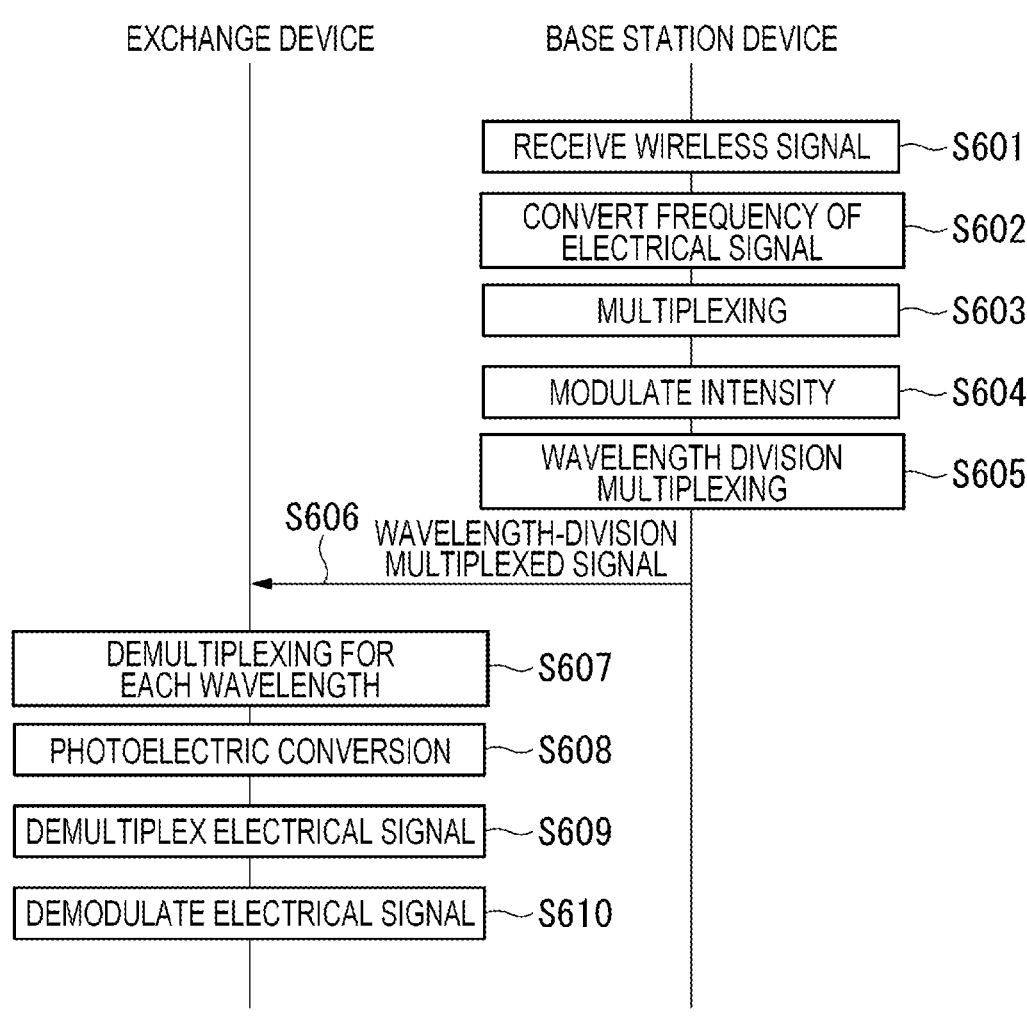
FIG. 13 is a sequence diagram illustrating a flow of processing of the wireless communication system according to the sixth embodiment.

FIG. 13 is a sequence diagram illustrating a flow of processing of the wireless communication system 1f according to the sixth embodiment.

The antenna 32 receives a wireless signal transmitted from an external device via the array 31 (step S601). The antenna 32 converts the received wireless signal into an electrical signal and outputs the electrical signal to the frequency conversion unit 33.

Each frequency conversion unit 33 converts a frequency of the electrical signal output from the input port into the frequency $f'_{Ri}$ corresponding to the optical wavelength $\lambda_{Rj}$ (step S602). The frequency conversion unit 33 outputs the electrical signal having the frequency $f'_{Ri}$ to the multiplexer 34. The multiplexer 34 multiplexes the electrical signal output from each frequency conversion unit 33 (step S603). The electrical signal multiplexed by the multiplexer 34 is output to the optical modulation unit 35.

The optical modulation unit 35 performs subcarrier multiplexing by modulating an intensity of an optical signal having a certain wavelength by using the electrical signal multiplexed by the multiplexer 34 (step S604). Thus, the optical modulation unit 35 generates a multiplexed signal. The optical modulation unit 35 outputs the generated multiplexed signal to the optical multiplexer 36. The optical multiplexer 36 multiplexes the multiplexed signal generated by each optical modulation unit 35 and performs wavelength division multiplexing (step S605). Thus, the optical multiplexer 36 generates a wavelength-division multiplexed signal. The optical multiplexer 36 transmits the generated wavelength-division multiplexed signal to the exchange device 10f via the optical transmission line 30 (step S606).

The wavelength-division multiplexed signal transmitted to the optical transmission line 30 is input to the exchange device 10f. The optical demultiplexer 17 of the exchange device 10f demultiplexes the input wavelength-division multiplexed signal according to the wavelength (step S607). Thus, the wavelength-division multiplexed signal becomes an optically modulated signal having the optical wavelength kA; and is output to the corresponding O/E 14. The O/s 14 are connected to the optical demultiplexer 17 according to the number of wavelengths. The O/E 14 converts the optically modulated signal having the optical wavelength $\lambda_{Rj}$ demultiplexed by the optical demultiplexer 17 into an electrical signal (step S608). By this processing, the optically modulated signal having the optical wavelength $\lambda_{Rj}$ is converted into an electrical signal having the frequency $f'_{Ri}$. The O/E 14 outputs the electrical signal having the frequency $f'_{Ri}$ to the demultiplexer 15.

The electrical signal having the frequency $f'_{Ri}$ output to the demultiplexer 15 is demultiplexed according to the frequency (step S609). The electrical signal having the frequency $f'_{Ri}$ demultiplexed by the demultiplexer 15 is input to the output unit 16. The output unit 16 demodulates the input electrical signal having the frequency $f'_{Ri}$ (step S610). For example, the output unit 16 may select and demodulate one of the $\Sigma''_{j=1}m_j$ combinations of the optical wavelength $\lambda_{Rj}$ and the frequency $f'_{Ri}$. This is equivalent to selecting one beam from the $\Sigma''_{j=1}m_j$ received beams. The output unit 16 can also form multiple beams by selecting and simultaneously using a plurality of frequencies and a plurality of optical wavelengths. The output unit 16 may perform MIMO signal processing after demodulating more than one of the input electrical signals having the frequencies $f'_{R1}, \ldots,$ and $f'_{Rm}$.

According to the wireless communication system 1f configured as described above, effects similar to those of the second embodiment can be obtained also in the upstream direction.

Seventh Embodiment

A seventh embodiment is different from the fifth embodiment in that a base station device performs subcarrier multiplexing and polarization division multiplexing and transmits a signal to an exchange device. In the seventh embodiment, differences from the fifth embodiment will be mainly described.

Figure 14:
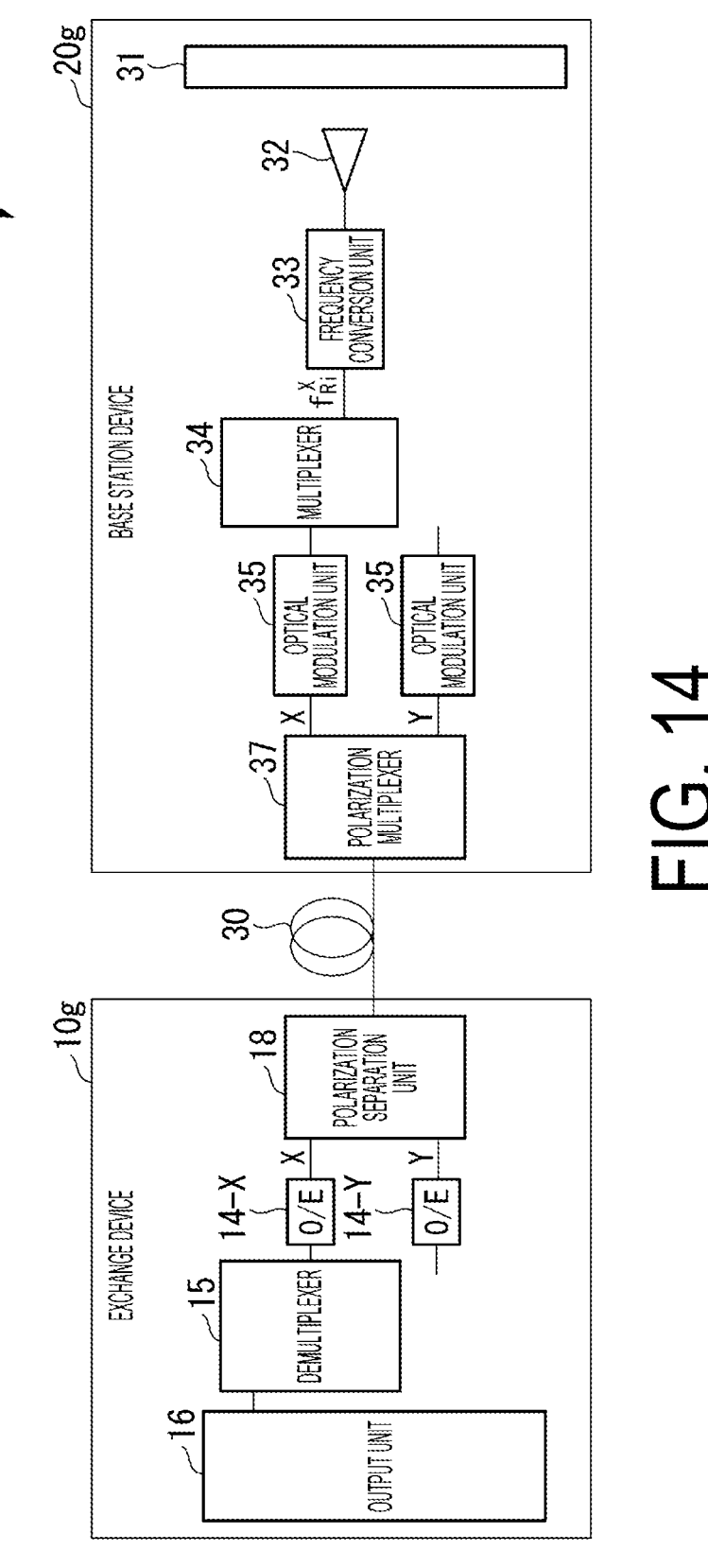
FIG. 14 illustrates a configuration example of a wireless communication system according to a seventh embodiment.

FIG. 14 illustrates a configuration example of a wireless communication system 1g according to the seventh embodiment. The wireless communication system 1g includes an exchange device 10g and a base station device 20g. The exchange device 10g and the base station device 20g are connected via an optical transmission line 30.

The base station device 20g includes an array 31, a plurality of antennas 32, a plurality of frequency conversion units 33, a plurality of multiplexers 34, a plurality of optical modulation units 35, and a polarization multiplexer 37. Although not illustrated in FIG. 14 for simplification of description, the optical modulation units 35 and the multiplexers 34 need to be provided for the number of (e.g. two) optical polarizations, and the frequency conversion units 33 need to be provided for the total number $(m_X+m_Y)$ of the number of frequencies $m_X$ used by the optical polarization X and the number of frequencies $m_Y$ used by the optical polarization Y. The antennas 32 need to be provided for the total number $(m_X+m_Y)$ of combinations of the optical polarization and the frequency to be used.

The polarization multiplexer 37 multiplexes signals subjected to subcarrier multiplexing by the plurality of optical modulation units 35 and performs polarization division multiplexing. Thus, the polarization multiplexer 37 generates a polarization-division multiplexed signal. The polarization multiplexer 37 transmits the generated polarization-division multiplexed signal to the exchange device 10g via the optical transmission line 30.

The exchange device 10g includes a polarization separation unit 18, a plurality of O/Es 14-X and 14-Y, a plurality of demultiplexers 15, and an output unit 16. Although not illustrated in FIG. 14 for simplification of description, the O/Es 14 and the demultiplexers 15 need to be provided for the number of (e.g. two) optical polarizations.

The polarization separation unit 18 separates an optical polarization k component of the polarization-division multiplexed signal received via the optical transmission line 30.

FIG. 15 is a sequence diagram illustrating a flow of processing of the wireless communication system 1g according to the seventh embodiment.

The antenna 32 receives a wireless signal transmitted from an external device via the array 31 (step S701). The antenna 32 converts the received wireless signal into an electrical signal and outputs the electrical signal to the frequency conversion unit 33.

Each frequency conversion unit 33 converts a frequency of the electrical signal output from the input port into the frequency $f^k_{Ri}$ corresponding to the optical polarization k (step S702). The frequency conversion unit 33 outputs the electrical signal having the frequency $f^k_{Ri}$ to the multiplexer 34. The multiplexer 34 multiplexes the electrical signal output from each frequency conversion unit 33 (step S703). The electrical signal multiplexed by the multiplexer 34 is output to the optical modulation unit 35.

The optical modulation unit 35 performs subcarrier multiplexing by modulating an intensity of an optical signal having the optical polarization k by using the electrical signal multiplexed by the multiplexer 34 (step S704). Thus, the optical modulation unit 35 generates a multiplexed signal. The optical modulation unit 35 outputs the generated multiplexed signal to the polarization multiplexer 37. The polarization multiplexer 37 multiplexes the multiplexed signal generated by each optical modulation unit 35 and performs polarization division multiplexing (step S705). Thus, the polarization multiplexer 37 generates a polarization-division multiplexed signal. The polarization multiplexer 37 transmits the generated polarization-division multiplexed signal to the exchange device 10g via the optical transmission line 30 (step S706).

The polarization-division multiplexed signal transmitted to the optical transmission line 30 is input to the exchange device 10g. The polarization separation unit 18 of the exchange device 10g separates the optical polarization k of the input polarization-division multiplexed signal (step S707). Thus, the polarization-division multiplexed signal becomes an optically modulated signal having the optical polarization k and is output to the corresponding O/E 14. The O/E 14 converts the optically modulated signal having the optical polarization k separated by the polarization separation unit 18 into an electrical signal (step S708). By this processing, the optically modulated signal having the optical polarization k is converted into an electrical signal having the frequency $f^k_{Ri}$. The O/E 14 outputs the electrical signal having the frequency $f^k_{Ri}$ to the demultiplexer 15.

The electrical signal having the frequency $f^k_{Ri}$ output to the demultiplexer 15 is demultiplexed according to the frequency (step S709). The electrical signal having the frequency $f^k_{Ri}$ demultiplexed by the demultiplexer 15 is input to the output unit 16. The output unit 16 demodulates the input electrical signal having the frequency $f^k_{Ri}$ (step S710). For example, the output unit 16 may select and demodulate one of the ($m_X+m_Y$) combinations of the optical polarization k and the frequency $f^k_{Ri}$. This is equivalent to selecting one beam from the ($m_X+m_Y$) received beams. The output unit 16 can also form multiple beams by selecting and simultaneously using a plurality of frequencies and a plurality of optical polarizations. The output unit 16 may perform MIMO signal processing after demodulating more than one of the input electrical signals having the frequencies $f^k_{R1}, \ldots,$ and $f^k_{Rm}$.

According to the wireless communication system 1g configured as described above, effects similar to those of the third embodiment can be obtained also in the upstream direction.

Eighth Embodiment

An eighth embodiment is different front the fifth embodiment in that a base station device performs wavelength division multiplexing and polarization division multiplexing and transmits a signal to an exchange device. In the eighth embodiment, differences from the fifth embodiment will be mainly described.

Figure 16:
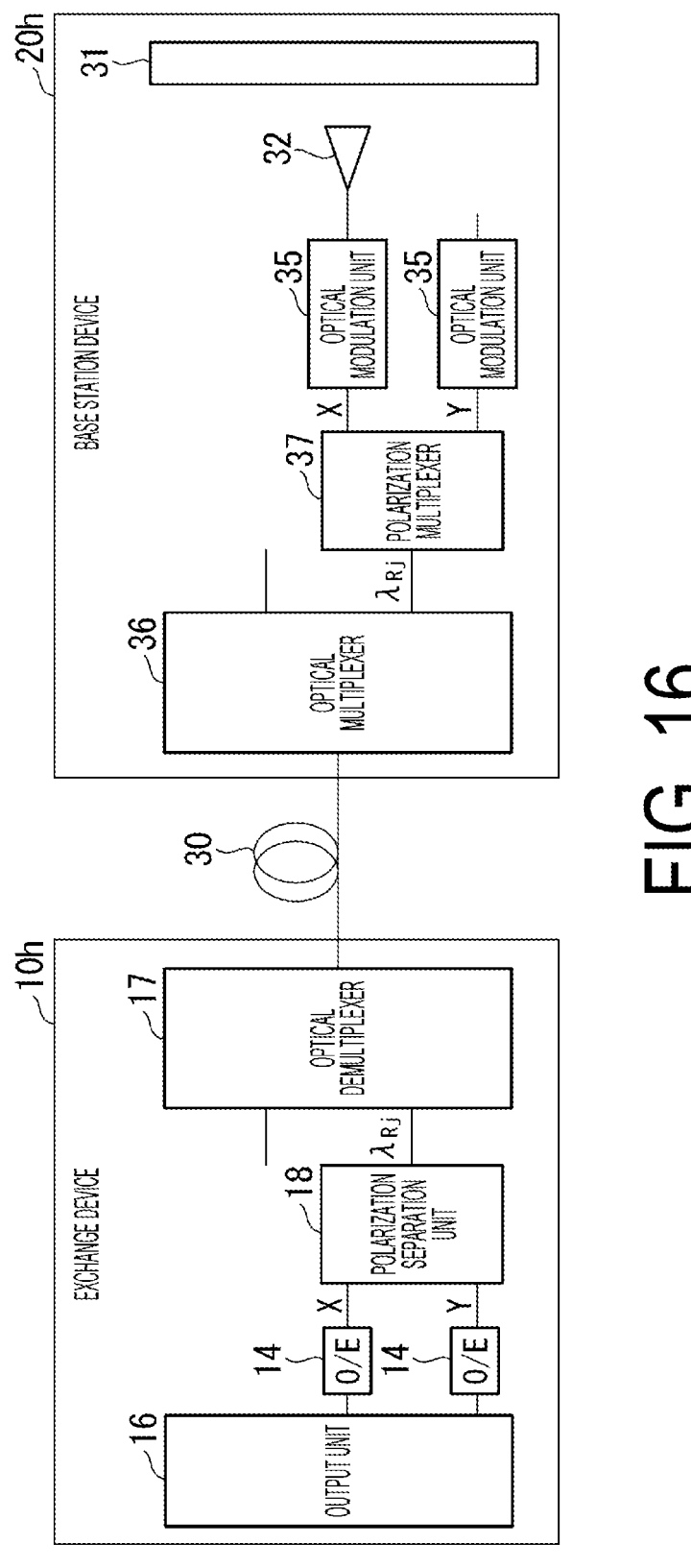
FIG. 16 illustrates a configuration example of a wireless communication system according to an eighth embodiment.

FIG. 16 illustrates a configuration example of a wireless communication system 1h according to the eighth embodiment. The wireless communication system 1h includes an exchange device 10h and a base station device 20h. The exchange device 10h and the base station device 20h are connected via an optical transmission line 30.

The base station device 20h includes an array 31, a plurality of antennas 32, a plurality of optical modulation units 35, a plurality of polarization multiplexers 37, and an optical multiplexer 36. Although not illustrated in FIG. 16 for simplification of description, the polarization multiplexers 37 need to be provided for the number n of optical wavelengths $\lambda_R$, and the optical modulation units 35 need to be provided for the number of (e.g. two) optical polarizations used by an optical wavelength $\lambda_{Rj}$. The antennas 32 need to be provided for the total number 2n of combinations of the optical wavelength and the optical polarization to be used.

The polarization multiplexer 37 multiplexes signals subjected to subcarrier multiplexing by the plurality of optical modulation units 35 and performs polarization division multiplexing. Thus, the polarization multiplexer 37 generates a polarization-division multiplexed signal.

The optical multiplexer 36 multiplexes signals subjected to polarization division multiplexing by the polarization multiplexer 37 and performs wavelength division multiplexing. Thus, the optical multiplexer 36 generates a wavelength-division multiplexed signal. The optical multiplexer 36 transmits the generated wavelength-division multiplexed signal to the base station device 20b via the optical transmission line 30.

The exchange device 10h includes an optical demultiplexer 17, a plurality of polarization separation units 18, a plurality of O/Es 14, and an output unit 16. Although not illustrated in FIG. 16 for simplification of description, the polarization separation units 18 need to be provided for the number n of optical wavelengths $\lambda_R$, and the O/Es 14 need to be provided for the number of (e.g. two) optical polarizations used by the optical wavelength $\lambda_{Rj}$.

The optical demultiplexer 17 demultiplexes the wavelength-division multiplexed signal received via the optical transmission line 30.

The polarization separation unit 18 separates an optical polarization k component of the optically modulated signal demultiplexed by the optical demultiplexer 17.

Figure 17:
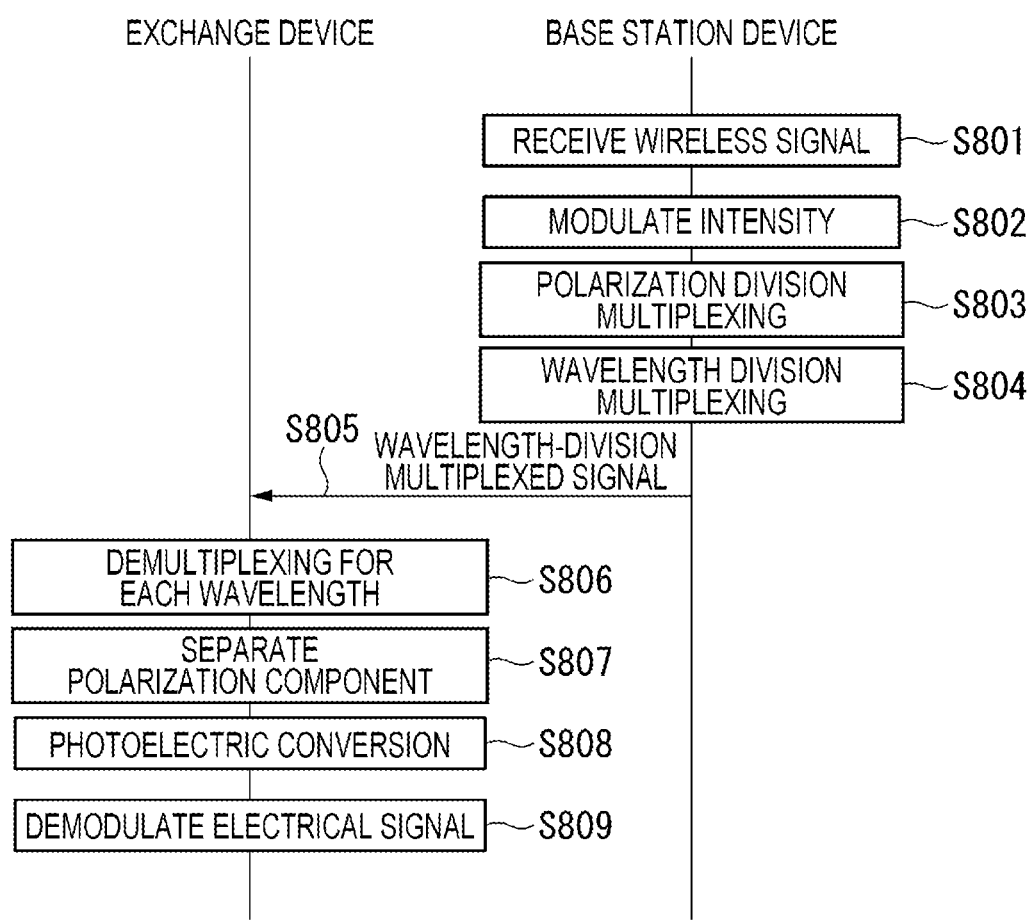
FIG. 17 is a sequence diagram illustrating a flow of processing of the wireless communication system according to the eighth embodiment.

FIG. 17 is a sequence diagram illustrating a flow of processing of the wireless communication system 1h according to the eighth embodiment. In FIG. 17, the same processing steps as those in FIG. 11 will be denoted by the same reference signs as those used in FIG. 11, and description thereof will be omitted.

The antenna 32 receives a wireless signal transmitted from an external device via the array 31 (step S801). The antenna 32 converts the received wireless signal into an electrical signal and outputs the electrical signal to the optical modulation unit 35.

Each optical modulation unit 35 modulates an intensity of an optical signal having the optical wavelength $\lambda_{Rj}$ and the optical polarization k by using the electrical signal output from the input port (step S802). The optical modulation unit 35 outputs the generated optically modulated signal having the optical polarization k to the polarization multiplexer 37.

The polarization multiplexer 37 multiplexes the optically modulated signal generated by each optical modulation unit 35 and performs polarization division multiplexing (step S803). Thus, the polarization multiplexer 37 generates a polarization-division multiplexed signal. The polarization multiplexer 37 outputs the generated polarization-division multiplexed signal to the optical multiplexer 36. The optical multiplexer 36 multiplexes the polarization-division multiplexed signal generated by each polarization multiplexer 37 and performs wavelength division multiplexing (step S804). Thus, the optical multiplexer 36 generates a wavelength-division multiplexed signal. The optical multiplexer 36 transmits the generated wavelength-division multiplexed signal to the exchange device 10$g$ via the optical transmission line 30 (step S805).

The wavelength-division multiplexed signal transmitted to the optical transmission line 30 is input to the exchange device 10$h$. The optical demultiplexer 17 of the exchange device 10$h$ demultiplexes the input wavelength-division multiplexed signal according to the wavelength (step S806). Thus, the wavelength-division multiplexed signal becomes an optically modulated signal having the optical wavelength $\lambda_{Rj}$ and is output to the corresponding polarization separation unit 18. The polarization separation unit 18 separates the optical polarization k of the input optically modulated signal having the optical wavelength $\lambda_{Rj}$ (step S807). Thus, the optically modulated signal having the optical wavelength $\lambda_{Rj}$ becomes an optically modulated signal having the optical polarization k and is output to the corresponding O/E 14. The O/E 14 converts the optically modulated signal having the optical polarization k separated by the polarization separation unit 18 into an electrical signal (step S808). By this processing, the optically modulated signal having the optical polarization k is converted into an electrical signal. The O/E 14 outputs the electrical signal to the output unit 16.

The output unit 16 demodulates the input electrical signal (step S809). For example, the output unit 16 may select and demodulate one of the 2n combinations of the optical wavelength $\lambda_{Rj}$ and the optical polarization k. This is equivalent to selecting one beam from the 2n received beams. The output unit 16 can also form multiple beams by selecting and simultaneously using a plurality of optical wavelengths and a plurality of optical polarizations. The output unit 16 may perform MIMO signal processing after demodulating more than one of the input electrical signals.

According to the wireless communication system 1$f$ configured as described above, effects similar to those of the fourth embodiment can be obtained also in the upstream direction.

Modification Example of Eighth Embodiment

Figure 18:
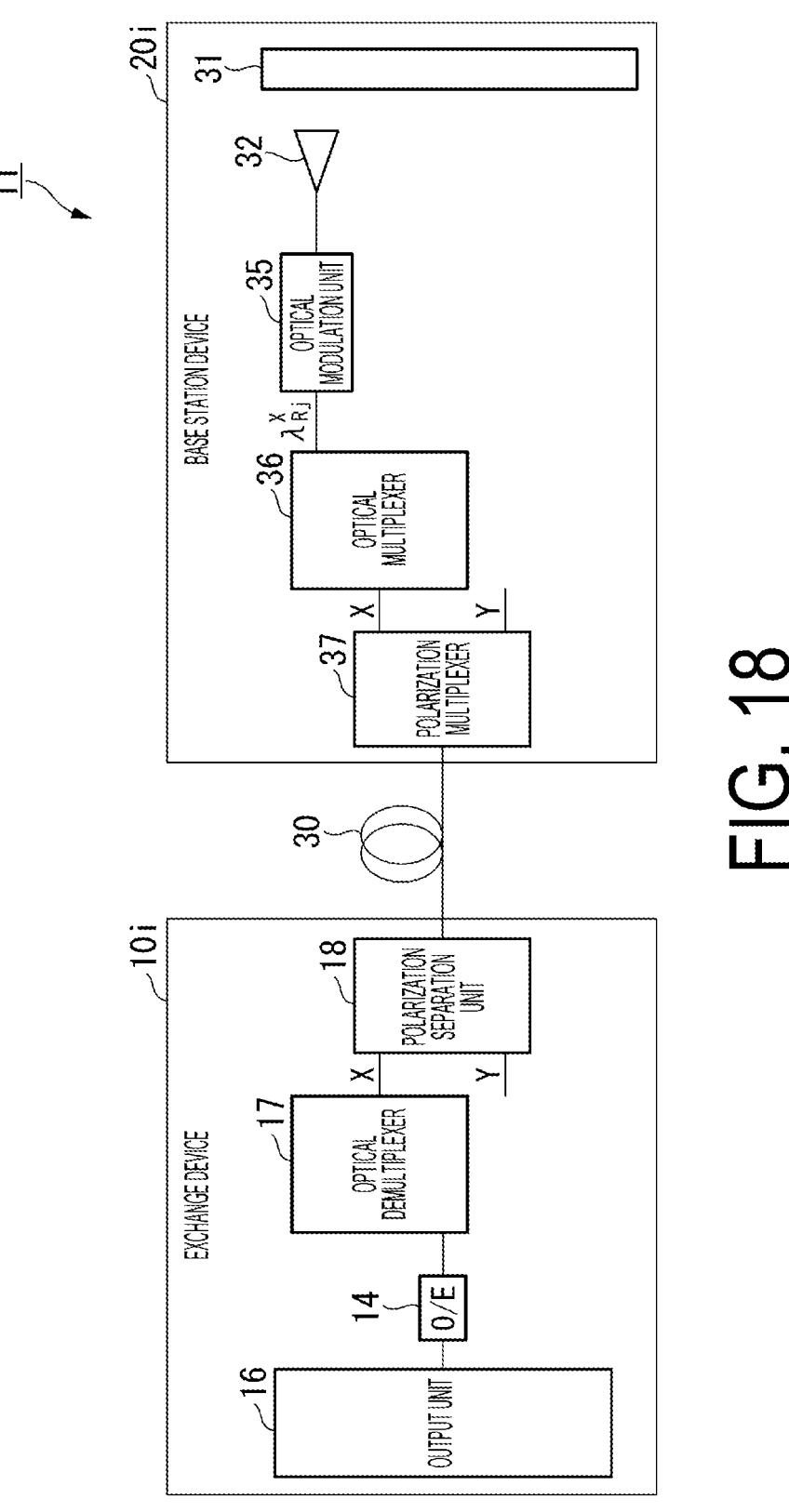
FIG. 18 illustrates a configuration example of a wireless communication system according to a modification example of the eighth embodiment.
Figure 19:
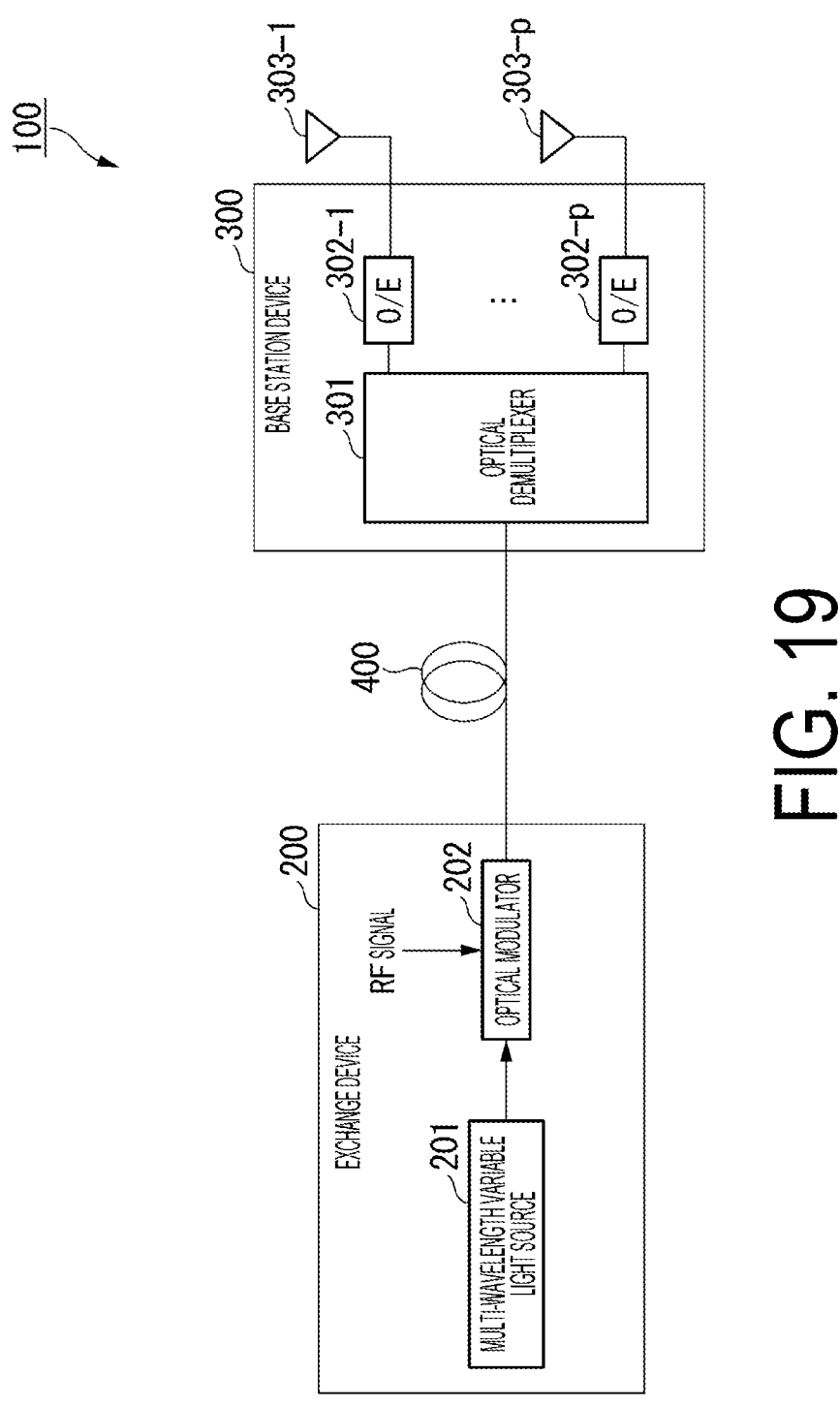
FIG. 19 is an explanatory diagram of an overview of a wireless communication system in Patent Literature 1.
Figure 20:
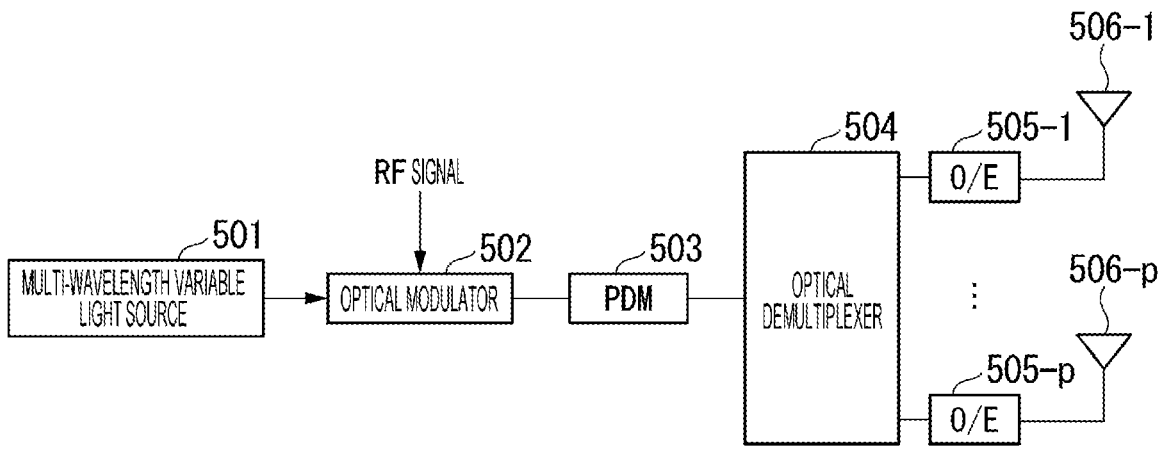
FIG. 20 is an explanatory diagram of a technique disclosed in Non Patent Literature 1.
Figure 21:
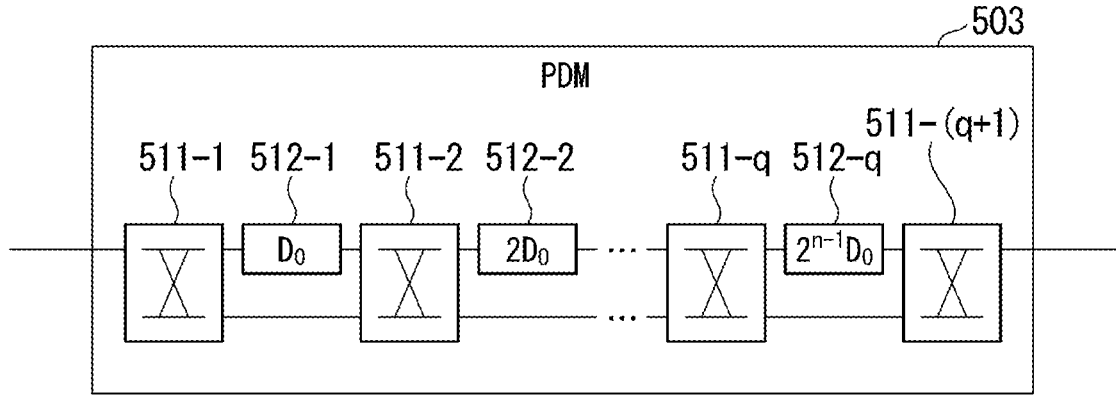
FIG. 21 illustrates a configuration example of a conventional PDM.

The exchange device 10$h$ and the base station device 20$h$ in FIG. 16 may be configured as illustrated in FIG. 18. FIG. 18 illustrates a configuration example of a wireless communication system 1$i$ according to a modification example of the eighth embodiment. The wireless communication system 1$i$ includes an exchange device 10$i$ and a base station device 20$i$. The exchange device 10$i$ and the base station device 20$i$ are connected via the optical transmission line 30.

The base station device 20$i$ includes an array 31, a plurality of antennas 32, a plurality of optical modulation units 35, a plurality of optical multiplexers 36, and a polarization multiplexer 37. Although not illustrated in FIG. 18 for simplification of description, the optical multiplexers 36 need to be provided for the number of (e.g. two) optical polarizations, and the optical modulation units 35 need to be provided for the total number $(m_X + m_Y)$ of the number of frequencies $m_X$ used by the optical polarization X and the number of frequencies $m_Y$ used by the optical polarization Y. Therefore, the antennas 32 need to be provided for the total number $(m_X + m_Y)$ of combinations of the optical polarization and the optical wavelength to be used.

Here, $(m_X + m_Y)$ combinations of the optical polarization k and the optical wavelength $\lambda_{Tj}$ have one-to-one correspondence with the $(m_X + m_Y)$ antennas 32 and $(m_X + m_Y)$ received beams.

The exchange device 10$i$ includes the polarization separation unit 18, the plurality of optical demultiplexers 17, the plurality of O/Es 14, and the output unit 16. Although not illustrated in FIG. 18 for simplification of description, the optical demultiplexers 17 need to be provided for the number n of optical wavelengths $\lambda_R$, and the O/Es 14 need to be provided for the number of (e.g. two) optical polarizations used by the optical wavelength $\lambda_{Rj}$.

In the base station device 20$h$ in FIG. 16, the wavelength division multiplexing is performed after the polarization division multiplexing, whereas, in the base station device 20$i$, the polarization division multiplexing is performed after the wavelength division multiplexing. In the exchange device 10$i$, the polarization separation unit 18 separates the optical polarization k component of the polarization-division multiplexed signal received via the optical transmission line 30, and then the optical demultiplexer 17 demultiplexes the signal according to the wavelength.

Modification Examples of First to Eighth Embodiments

The configurations in the first to fourth embodiments and the configurations in the fifth to eighth embodiments may be combined. For example, the first embodiment and the fifth embodiment may be combined. In this case, the exchange device 10 and the exchange device 10$e$ are combined as the exchange device, and the base station device 20 and the base station device 20$e$ are combined as the base station device. For example, the second embodiment and the sixth embodiment may be combined. For example, the third embodiment and the seventh embodiment may be combined. For example, the fourth embodiment and the eighth embodiment may be combined.

The first to eighth embodiments show the configurations of controlling only the frequency, controlling the frequency and the optical wavelength, controlling the frequency and the optical polarization, and controlling the optical polarization and the optical wavelength. In the first to eighth embodiments, all of the optical polarization, the optical wavelength, and the frequency may be controlled. In such a configuration, in a case of transmission in the downstream direction, it is only necessary to combine the configuration in the first embodiment and the configuration in the fourth embodiment so as to control all of the optical polarization, the optical wavelength, and the frequency. In a case of transmission in the upstream direction, it is only necessary to combine the configuration in the fifth embodiment and the configuration in the eighth embodiment so as to control all of the optical polarization, the optical wavelength, and the frequency.

Some functional units of the exchange devices 10, 10$a$, 10$b$, 10$c$, 10$d$, 10$e$, 10$f$, 10$g$, 10$h$, and 10$i$ and the base station devices 20, 20$a$, 20$b$, 20$c$, 20$d$, 20$e$, 20$f$, 20$g$, 20$h$, and 20$i$ in the above embodiments may be implemented by a computer. In that case, a program for implementing those functions may be recorded in a computer-readable recording medium, and the program recorded in the recording medium may be read and executed by a computer system to implement the functions. The "computer system" herein includes an OS and hardware such as a peripheral device.

The "computer-readable recording medium" refers to a portable medium such as a flexible disk, a magneto-optical disc, a ROM, or a CD-ROM or a storage device such as a hard disk included in the computer system. Further, the "computer-readable recording medium" may include a medium that dynamically holds the program for a short time, such as a communication line used to transmit the program via a network such as the Internet or a communication line such as a telephone line, and a medium that holds the program for a certain period of time, such as a volatile memory inside the computer system serving as a server or a client in that case. Further, the above program may be for implementing some of the above functions, may implement the above functions in combination with a program already recorded in the computer system, or may be implemented by using a programmable logic device such as an FPGA.

Hereinabove, the embodiments of the present invention have been described in detail with reference to the drawings, but specific configurations are not limited to those embodiments and include designs and the like within the spirit of the present invention.

INDUSTRIAL APPLICABILITY

The present invention is applicable to a wireless communication system that performs analog RoF transmission.

REFERENCE SIGNS LIST 10, 10a, 10b, 10c, 10d, 10e, 10f, 10g, 10h, 10i Exchange device
11, 11a, 11b Control unit
12, 12a, 12b Frequency conversion unit
13, 13a, 13b, 35 Optical modulation unit
14 O/E
15 Demultiplexer
16 Output unit
20, 20a, 20b, 20c, 20d, 20e, 20f, 20g, 20h, 20i Base station device
21 O/E
22 Demultiplexer
23-1 to 23-m, 33 Frequency conversion unit
24-1 to 24-m, 32-1 to 32-m Antenna
25 Lens/reflector
26 Optical demultiplexer
27 Polarization separation unit
34 Multiplexer
36 Optical multiplexer
37 Polarization multiplexer

The invention claimed is:

1. A wireless communication method in a wireless communication system including an exchange device and a base station device configured to perform beamforming according to the control of the exchange device, wherein:

the exchange device performs beamforming control of the base station device by transmitting an optically modulated signal to the base station device via an optical transmission line, the optically modulated signal being generated by modulating an intensity of an optical signal on a basis of a transmission signal to be transmitted by controlling any combination of an optical wavelength, a frequency, and an optical polarization or controlling the frequency; and the base station device performs beamforming in a direction in which a wireless signal radiated from an antenna to which an electrical signal based on the optically modulated signal has been input is reflected by a reflector or is transmitted through a lens among antennas corresponding to the number of combinations of the optical wavelength, the frequency, and the optical polarization or the number of frequencies.

2. The wireless communication method according to claim 1, wherein:

the exchange device performs the beamforming control of the base station device by transmitting the optically modulated signal to the base station device, the optically modulated signal being generated by controlling the frequency to convert a frequency of the transmission signal and modulating the intensity of the optical signal on the basis of the transmission signal having the converted frequency; and the base station device converts the optically modulated signal into an electrical signal, then demultiplexes the electrical signal according to the frequency, and inputs the electrical signal to the antenna to perform beamforming.

3. The wireless communication method according to claim 1, wherein:

the exchange device performs the beamforming control of the base station device by transmitting the optically modulated signal to the base station device, the optically modulated signal being generated by controlling the combination of the optical wavelength and the frequency to convert a frequency of the transmission signal and modulating the intensity of the optical signal having the controlled optical wavelength on the basis of the transmission signal having the converted frequency; and the base station device demultiplexes the optically modulated signal according to the wavelength, converts the optically modulated signal demultiplexed for each wavelength into an electrical signal, demultiplexes the electrical signal according to the frequency, and inputs the electrical signal to the antenna to perform beamforming.

4. The wireless communication method according to claim 1, wherein:

the exchange device performs the beamforming control of the base station device by transmitting the optically modulated signal to the base station device, the optically modulated signal being generated by controlling the combination of the optical polarization and the frequency to convert a frequency of the transmission signal and modulating the intensity of the optical signal having the controlled optical polarization on the basis of the transmission signal having the converted frequency; and the base station device separates an optical polarization component of the optically modulated signal, converts the optically modulated signal separated for each optical polarization component into an electrical signal, demultiplexes the electrical signal according to the frequency, and inputs the electrical signal to the antenna to perform beamforming.

5. The wireless communication method according to claim 1, wherein:

the exchange device performs the beamforming control of the base station device by transmitting the optically modulated signal to the base station device, the optically modulated signal being generated by controlling the combination of the optical polarization and the optical wavelength to modulate the intensity of the optical signal having the optical polarization having the controlled optical wavelength by using the transmission signal; and the base station device demultiplexes the optically modulated signal according to the wavelength and then separates an optical polarization component of the optically modulated signal demultiplexed for each wavelength or separates the optical polarization component of the optically modulated signal and then demultiplexes the optically modulated signal separated for each optical polarization component according to the wavelength, converts the optically modulated signal into an electrical signal, and inputs the electrical signal to the antenna to perform beamforming.

6. The wireless communication method according to claim 1, wherein:

the exchange device performs the beamforming control of the base station device by transmitting the optically modulated signal to the base station device, the optically modulated signal being generated by controlling the combination of the optical polarization, the frequency, and the optical wavelength to convert a frequency of the transmission signal and modulating the intensity of the optical signal having the optical polarization having the controlled optical wavelength on the basis of the transmission signal having the converted frequency; and the base station device inputs the electrical signal obtained on the basis of the optically modulated signal to the antenna to perform beamforming.

7. The wireless communication method according to claim 1, wherein:

the base station device receives a wireless signal transmitted from an external device via the reflector or the lens by using the antenna, converts the wireless signal into an electrical signal, outputs the electrical signal, and transmits, to the exchange device, an optical signal whose intensity has been modulated by using the electrical signal; and the exchange device demodulates the optical signal transmitted from the base station device.

8. A wireless communication system including an exchange device and a base station device configured to perform beamforming according to control of the exchange device, wherein:

the exchange device includes a controller configured to control any combination of an optical wavelength, a frequency, and an optical polarization or controls the frequency, and an optical modulator configured to transmit an optically modulated signal to the base station device via an optical transmission line, the optically modulated signal being generated by modulating an intensity of an optical signal on a basis of a transmission signal to be transmitted on a basis of the any combination of the optical wavelength, the frequency, and the optical polarization or the frequency switched by the controller;

the base station device includes antennas corresponding to the number of combinations of the optical wavelength, the frequency, and the optical polarization or the number of frequencies, and a reflector or lens configured to reflect or transmits a wireless signal radiated from an antenna to which an electrical signal based on the optically modulated signal has been input; and the reflector or the lens performs beamforming in a direction in which the reflection or the transmission has been performed.

* * * * *